(12) United States Patent
Homrighaus et al.

(10) Patent No.: US 11,262,015 B2
(45) Date of Patent: *Mar. 1, 2022

(54) CIPP LINER FEED ROLLER

(71) Applicant: Subsurface, Inc., Moorhead, MN (US)

(72) Inventors: Jason M. Homrighaus, Moorhead, MN (US); Brandon G. Strom, Vergas, MN (US); Gary H. Strom, Moorhead, MN (US)

(73) Assignee: Subsurface, Inc., Fargo, ND (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/101,666

(22) Filed: Nov. 23, 2020

(65) Prior Publication Data

US 2021/0071802 A1    Mar. 11, 2021

Related U.S. Application Data

(63) Continuation of application No. 15/480,630, filed on Apr. 6, 2017, now Pat. No. 10,851,933.

(51) Int. Cl.
*F16L 55/18* (2006.01)
*B65H 20/02* (2006.01)
*F16L 55/165* (2006.01)

(52) U.S. Cl.
CPC ............ *F16L 55/18* (2013.01); *B65H 20/02* (2013.01); *B65H 2404/144* (2013.01);
(Continued)

(58) Field of Classification Search
CPC ...... F16L 55/18; F16L 55/1651; B65H 20/02; B65H 2511/224; B65H 2701/172; B65H 2404/144; B65H 2701/11214
See application file for complete search history.

(56) References Cited

U.S. PATENT DOCUMENTS 4,385,885 A    5/1983  Wood
4,668,125 A *  5/1987  Long, Jr. .................. E03F 3/06
                                                        138/141
(Continued)

FOREIGN PATENT DOCUMENTS

DE          19702854 A1    7/1998

OTHER PUBLICATIONS http://cipp-services.com/air-inverters.html; "Air-Inverters-Shooters" Webpage from CIPP Services, Inc., Downloaded and Printed on Apr. 13, 2013.
(Continued)

*Primary Examiner* — Seyed Masoud Malekzadeh
(74) *Attorney, Agent, or Firm* — Neustel Law Offices

(57) ABSTRACT

A CIPP liner feed roller for manipulating and feeding CIPP liner by pulling CIPP liner from a liner source and feeding it to where it is needed. The CIPP liner feed roller generally includes a main roller attached to a frame, a clamping roller attached to the frame and configured to be in parallel with the main roller, wherein the distance between the clamping roller and the main roller can be adjusted using one or more actuators, a drive unit comprising a motor configured to control the rotation of the main roller within the frame, a controller coupled to the drive unit and the one or more actuators, wherein the controller is configured to control the rotation of the main roller and the distance between the clamping roller and the main roller, and a support beam attached the frame and configured to be in parallel with the main roller.

26 Claims, 32 Drawing Sheets

(52) U.S. Cl.
CPC .................. *B65H 2511/224* (2013.01); *B65H 2701/11214* (2013.01); *B65H 2701/172* (2013.01); *F16L 55/1651* (2013.01)

(56) References Cited

U.S. PATENT DOCUMENTS

| | | | |
|---|---|---|---|
| 4,685,983 A | 8/1987 | Long, Jr. | |
| 4,773,666 A | 9/1988 | Koberlein | |
| 4,863,365 A | 9/1989 | Ledoux | |
| 5,092,756 A | 3/1992 | Gau | |
| 5,201,406 A | 4/1993 | Kellis | |
| 5,358,359 A * | 10/1994 | Long, Jr. | F16L 55/1651 138/97 |
| 5,374,174 A * | 12/1994 | Long, Jr. | B29C 63/36 156/287 |
| 6,390,795 B1 | 5/2002 | Waring | |
| 6,423,258 B1 | 7/2002 | Thompson | |
| 6,439,445 B1 | 8/2002 | De Groot | |
| 6,960,313 B2 | 11/2005 | Waring | |
| 7,374,127 B2 | 5/2008 | Gallagher | |
| 7,476,348 B2 | 1/2009 | Waring | |
| 7,682,106 B1 | 3/2010 | Bowar | |
| 7,988,437 B1 | 8/2011 | Bonanotte | |
| 8,038,913 B2 * | 10/2011 | Driver | B29C 63/36 264/36.17 |
| 9,534,726 B1 | 1/2017 | Strom | |
| 9,927,059 B2 * | 3/2018 | Penza | G01B 11/026 |
| 10,550,988 B2 | 2/2020 | Strom | |
| 2002/0163102 A1 | 11/2002 | Thompson | |
| 2003/0024858 A1 | 2/2003 | Stibbard | |
| 2003/0209823 A1 | 11/2003 | Waring | |
| 2007/0029688 A1 | 2/2007 | Delaney | |
| 2011/0180639 A1 | 7/2011 | Lester | |
| 2012/0199276 A1 | 8/2012 | Rodenberger | |
| 2013/0263443 A1 | 10/2013 | Delaney | |

OTHER PUBLICATIONS http://cipp-services.com/refrigerated-trucks.html; "Refrigerated Liner Unloader Trailers" Webpage from CIPP Services, Inc., Downloaded and Printed on Apr. 16, 2013.

* cited by examiner

CIPP LINER FEED ROLLER

CROSS REFERENCE TO RELATED APPLICATIONS

The present application is a continuation of U.S. application Ser. No. 15/480,630 filed on Apr. 6, 2017 which issues on Dec. 1, 2020 as U.S. Pat. No. 10,851,933. Each of the aforementioned patent applications, and any applications related thereto, is herein incorporated by reference in their entirety.

STATEMENT REGARDING FEDERALLY SPONSORED RESEARCH OR DEVELOPMENT

Not applicable to this application.

BACKGROUND

Field

Example embodiments in general relate to a CIPP liner feed roller for preparing and inserting CIPP liner into an access opening, including folding of the CIPP liner prior to insertion.

Related Art

Any discussion of the related art throughout the specification should in no way be considered as an admission that such related art is widely known or forms part of common general knowledge in the field.

Cured-in-place pipe (CIPP) liners have been used for many years for the rehabilitation of different types and sizes of conduit and piping systems such as utility, sewer, water, electric, telecom, industrial, petroleum, fire suppression, heating, cooling and the like. The majority of materials used to manufacture these liners is felt and fleece type fabrics which have a thin flexible PVC or Polyurethane type jacket coating on one side. The liners are usually impregnated with a thermosetting type resin then installed by inverting the liner inside of the host conduit or pipe with air or water.

Ultraviolet (UV) cured-in-place pipe liner is a recent type of CIPP liner that utilizes UV light to cure the CIPP liner inside of a conduit. UV cured CIPP liners are bulky and relatively heavy to work with. Furthermore, UV cured CIPP liners need to be handled carefully because if the outer protective layer is damaged or partially removed, the UV cured CIPP liner will harden within minutes when exposed to sunlight. U.S. Pat. No. 8,580,364 to Quitter illustrates an exemplary UV cured CIPP liner. One advantage of UV cured CIPP liners is they are relatively environmentally friendly compared to traditional CIPP liners that are impregnated with a thermosetting type resin that can leach into the surrounding waterways. However, UV cured CIPP liners are typically thicker and heavier than conventional CIPP liners making it difficult to maneuver them, particularly through smaller openings.

Prior methods of feeding CIPP liner (including UV cured CIPP liners) into access openings include the use of conveyer belts and single task devices. In some cases, the CIPP liner is pulled directly from a truck into an access opening (e.g. manhole) that is smaller than the width of the CIPP liner requiring workers to manually fold the liner upon itself to fit through the access opening. Such prior methods lack configurability and are generally incapable to folding CIPP liner as part of the feeding process.

SUMMARY

An example embodiment is directed to a CIPP liner feed roller configured to pull CIPP liner from a liner source and push the CIPP liner to where it is needed. The CIPP liner feed roller includes a main roller attached to a frame, and a clamping roller attached to the frame and configured to be in parallel with the main roller, wherein the distance between the clamping roller and the main roller can be adjusted using one or more actuators. The combination of the main roller and clamping roller is used to pull the CIPP liner through the CIPP liner feed roller. The CIPP liner feed roller may also include a drive unit comprising a motor configured to control the rotation of the main roller within the frame and a controller coupled to the drive unit and the one or more actuators, wherein the controller is configured to control the rotation of the main roller and the distance between the clamping roller and the main roller. The CIPP liner feed roller may also include a support beam attached to the frame and configured to be in parallel with the main roller to enable the attachment of various accessories to add or improve the functionality of the CIPP liner feed roller. These accessories include, but are not limited to, support legs, guide rollers, a folding roller assembly, a balance roller, and an infeed table.

There has thus been outlined, rather broadly, some of the embodiments of the CIPP liner feed roller in order that the detailed description thereof may be better understood, and in order that the present contribution to the art may be better appreciated. There are additional embodiments of the CIPP liner feed roller that will be described hereinafter and that will form the subject matter of the claims appended hereto. In this respect, before explaining at least one embodiment of the CIPP liner feed roller in detail, it is to be understood that the CIPP liner feed roller is not limited in its application to the details of construction or to the arrangements of the components set forth in the following description or illustrated in the drawings. The CIPP liner feed roller is capable of other embodiments and of being practiced and carried out in various ways. Also, it is to be understood that the phraseology and terminology employed herein are for the purpose of the description and should not be regarded as limiting.

BRIEF DESCRIPTION OF THE DRAWINGS

Example embodiments will become more fully understood from the detailed description given herein below and the accompanying drawings, wherein like elements are represented by like reference characters, which are given by way of illustration only and thus are not limitative of the example embodiments herein.

DETAILED DESCRIPTION

A. Overview

Figure 1:
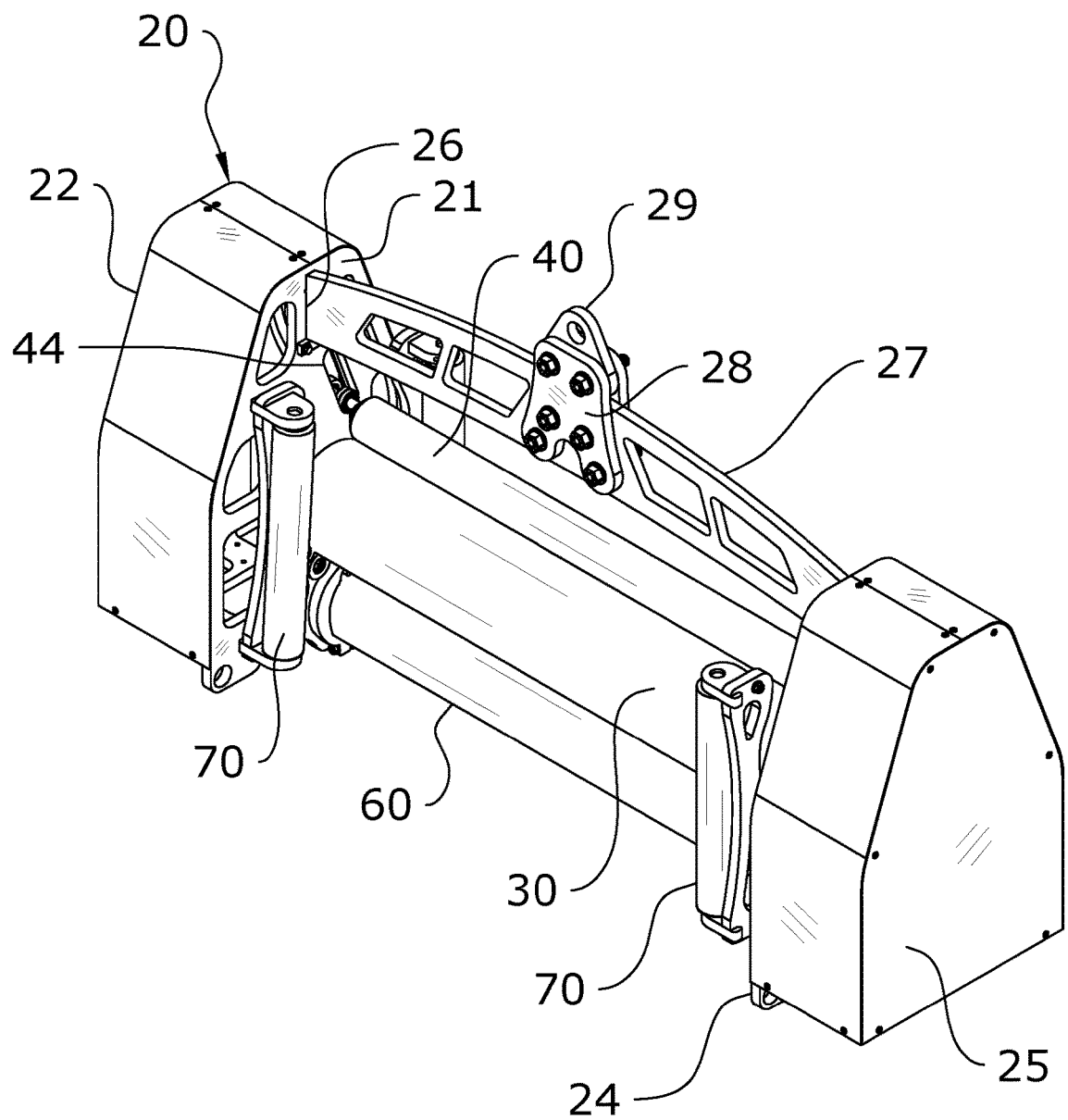
FIG. 1 is a perspective view of a CIPP liner feed roller in accordance with an example embodiment.

Turning now descriptively to the drawings, in which similar reference characters denote similar elements throughout the several views, FIGS. 1 through 30 illustrate a CIPP liner feed roller, which comprises a frame 20 having a left side and a right side, a main roller 30 attached to the frame 20, a clamping roller 40 attached to the frame 20 and configured to be in parallel with the main roller 30, wherein the distance between the clamping roller 40 and the main roller 30 can be adjusted using one or more actuators 42, a drive unit 50 configured to control the rotation of the main roller 30 within the frame 20, a controller 54 coupled to the drive unit 50 and the actuators 42, wherein the controller 54 is configured to control the rotation of the main roller 30 and the distance between the clamping roller 40 and the main roller 30, and a support beam 60 attached to the frame 20 and configured to be in parallel with the main roller 30. Some embodiments also include controller openings 55 configured to route power and control cables between the controller 54 and the drive unit 50, and the one or more actuators 42. Some embodiments may also include a passage within the support beam 60 that enable the passage of cables between the left side of the frame 20 and the right side of the frame 20. Some embodiments include a bridge beam 27, a bridge connector 28, and a bridge attachment 29 that enable the CIPP liner feed roller to be lifted using a crane. The CIPP liner feed roller is generally configured to pull CIPP liner 10 between the main roller 30 and the clamping roller 40 from a liner source, such as a liner box 11, and push the CIPP liner 10 away from the CIPP liner feed roller, which is usually towards an access opening 14. The CIPP liner 11 may be comprised of various types of CIPP liners including, but not limited to, UV cured CIPP liners.

B. Frame

FIGS. 1 through 8, 11 through 15, 17 through 21, and 23 through 30 illustrate an exemplary frame 20 for a CIPP liner feed roller. The frame 20 is generally configured to house a main roller 30, a clamping roller 40, one or more actuators 42, a drive unit 50, and a controller 54. The frame 20 generally comprises a left side plate 21, a left outer panel 22, a right side plate 24, a right outer panel 25, a bridge beam 27 and a support beam 60. The frame 20 may also include supplemental structural support, such as a bottom plate 23. The respective left and right sides of the frame 20 may also include panels to protect any components stored within the sides of the frame 20. The frame 20 may include an access panel 58 that may be used to route power cables to the CIPP liner feed roller as well as provide for the passage of cables to the operator controls 56.

Figure 16:
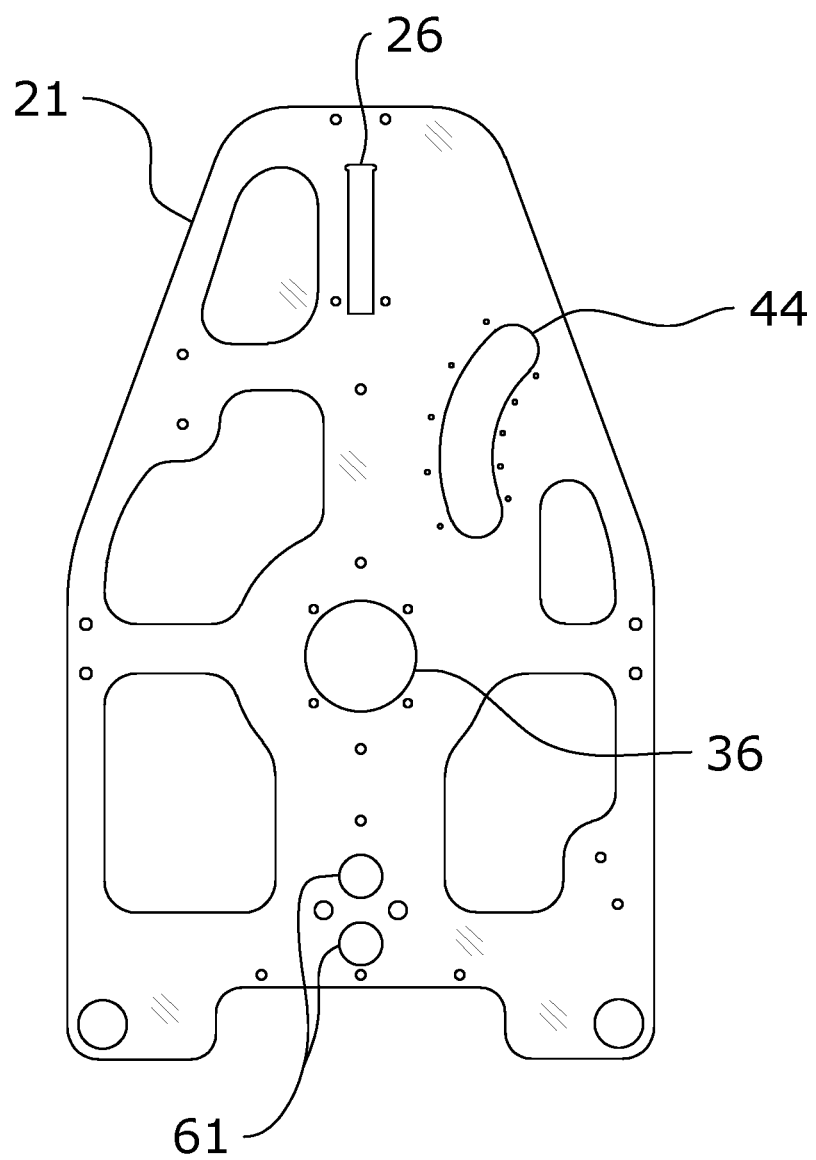
FIG. 16 is a right-side view of a left side plate in accordance with an example embodiment.

The left side of the CIPP liner feed roller generally comprises a left outer panel 22 and a left side plate 21. The left side plate 21 is configured to support a main roller 30, a clamping roller 40, a bridge beam 27, and a support beam 60. The left side plate 21 also includes apertures to support the connection of the various components using nuts and bolts. These apertures could also be used for other attachment methods. In addition, the apertures could be threaded to support the insertion of a bolt directly. As shown in FIG. 16, the left side plate 21 comprises a clamping roller slot 44 that permits the left side of the clamping roller 40 to move towards or away from the main roller 30. The left side plate 21 may also be configured to support at least one actuator 42 that is operatively coupled to the clamping roller 40 such that the motion of the actuator will move the clamping roller 40 towards or away from the main roller 30 in the manner defined by the clamping roller slot 44. Although FIG. 16 illustrates the clamping roller slot 44 as an arc, other configurations can be used such as a straight slot, for example. The left side plate 21 also includes support beam openings 61, which provide access to a passage within support beam 60, if present. The left side plate 21 also includes a bridge slot 26, which is configured to accept the bridge beam 27.

The right side plate 24 of the CIPP liner feed roller is generally configured to be the mirror image of the left side plate 21. However, this may not be the case, if either the left side plate 21 or the right side plate 24 is configured to support components that are not needed on both sides. However, any superfluous openings could also simply be left unused.

Figure 7:
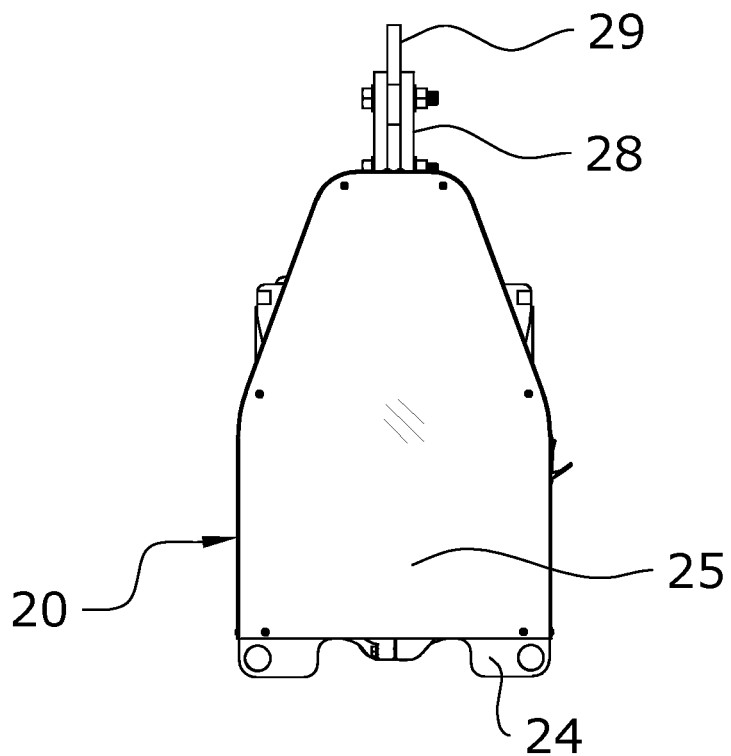
FIG. 7 is a right-side view of a CIPP liner feed roller in accordance with an example embodiment.
Figure 8:
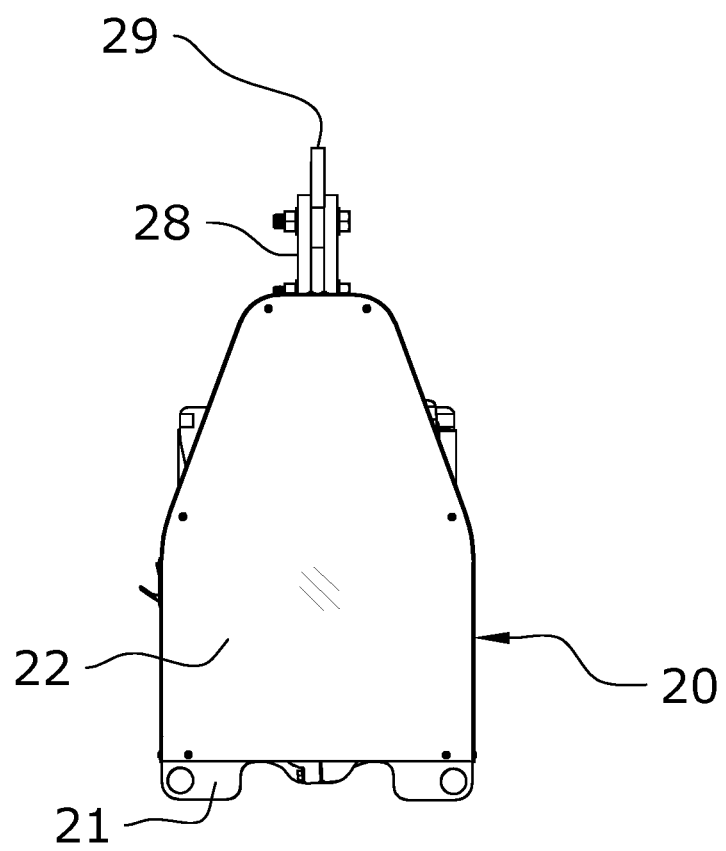
FIG. 8 is a left-side view of a CIPP liner feed roller in accordance with an example embodiment.
Figure 17:
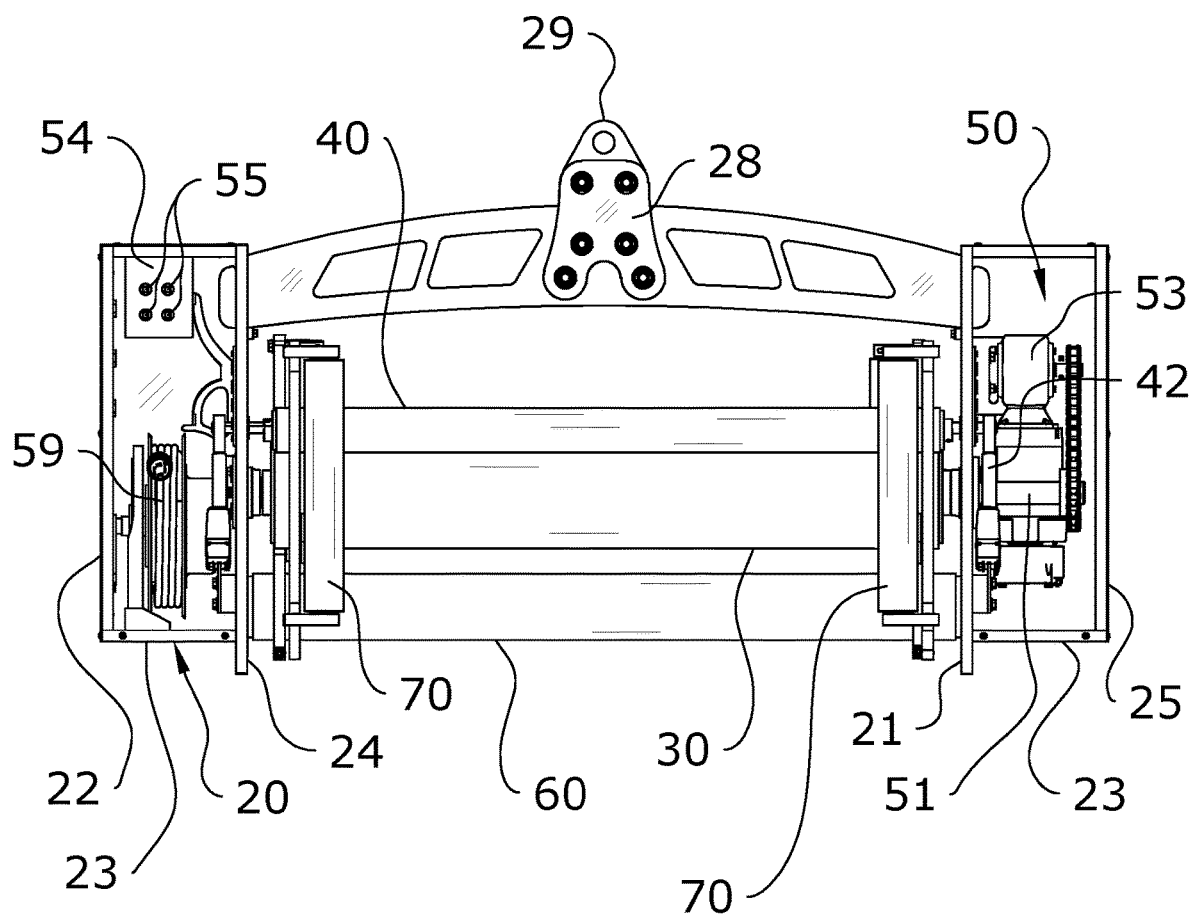
FIG. 17 is a front view of a CIPP liner feed roller in accordance with an example embodiment with the interior of the sides of the frame exposed.
Figure 18:
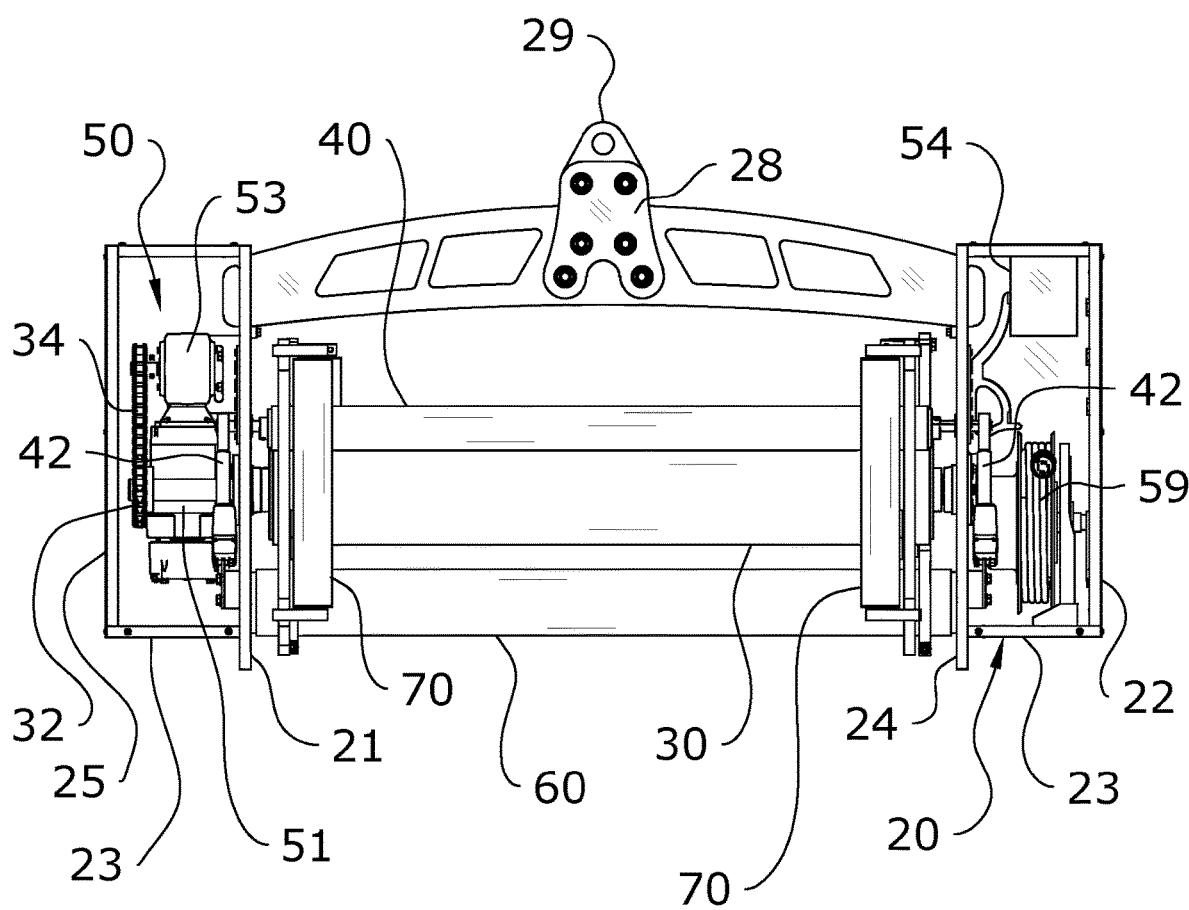
FIG. 18 is a rear view of a CIPP liner feed roller in accordance with an example embodiment with the interior of the sides of the frame exposed.
Figure 25:
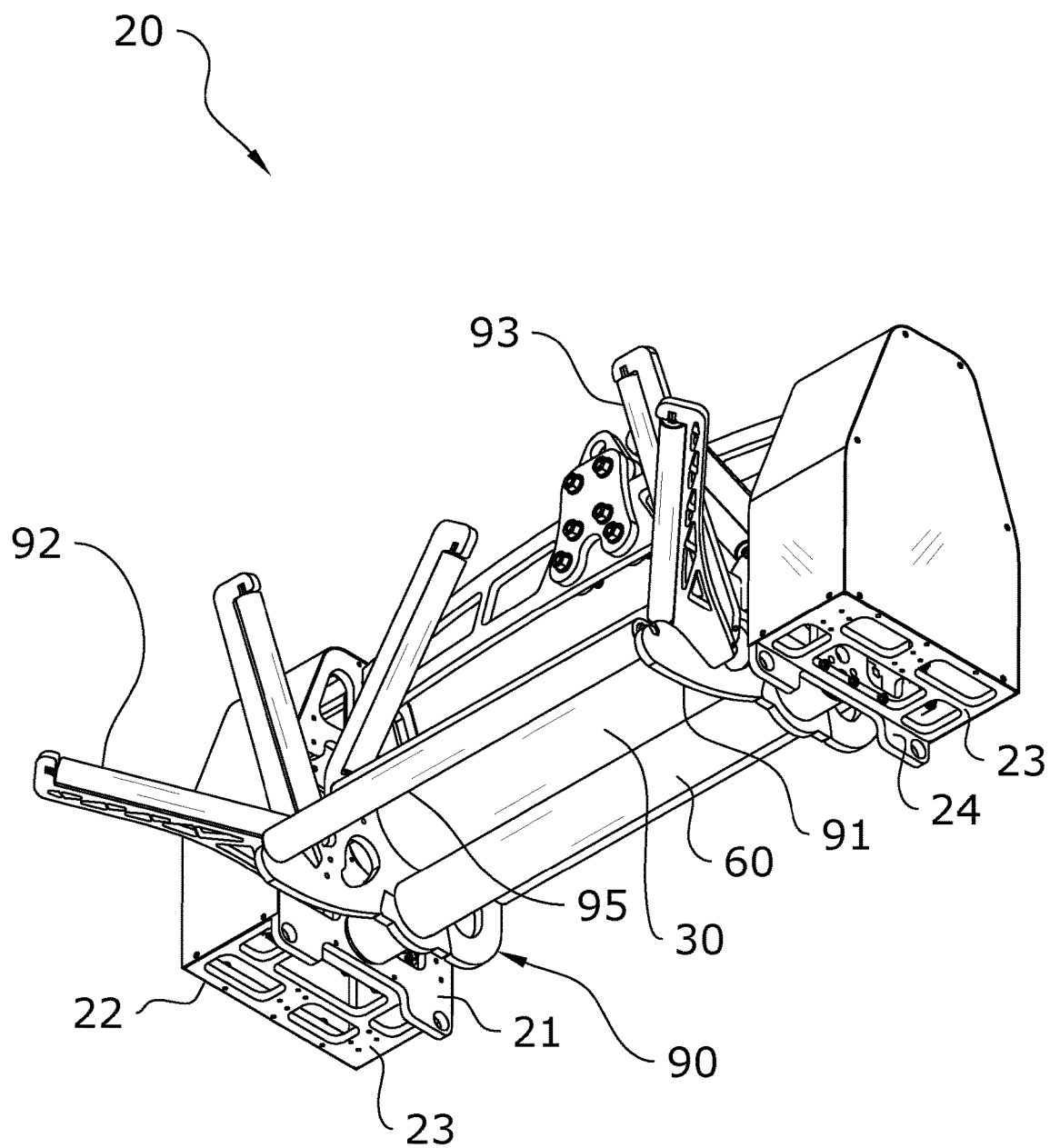
FIG. 25 is an alternate perspective view of a CIPP liner feed roller in accordance with an example embodiment that includes a folding roller assembly.

The right side of frame 20 and left side of the frame 20 generally include a left outer panel 22 and a right outer panel 25, respectively. The outer panels 22, 25 provide protection for any equipment contained within the respective sides. The sides of the frame 20 may also contain outer plates that provide additional mounting surfaces for any such equipment, such as those shown in FIGS. 20 and 21. These outer plates are directly behind the corresponding outer panel 22 or 25. The left side of the frame 20 may also include a bottom plate 23 that can maintain the separation between left side plate 21 and left side panel 22, as shown in FIGS. 17, 18 and 25. In other embodiments, structural support can be located at the top of a frame side, or at intermediate locations between the left side plate 21 and the left outer panel 22. The right side of frame 20 has a similar configuration with a right outer panel 25, as illustrated in FIGS. 1 and 7, for example.

As shown in FIGS. 1 through 19, for example, the frame 20 generally includes a bridge beam 27 that provides additional structural support to the frame 20, and may also provide a connection for attaching the CIPP liner feed roller to a crane or other lifting device. The bridge beam 27 is generally connected to the left side of the frame 20 using a bridge slot 26 within the left side plate 21 and a complementary bridge slot 26 within the right side plate 24. The bridge beam 27 may also include one or more bridge connectors 28 that can be used to attach one or more bridge attachments 29 to the bridge beam 27. For example, FIGS. 1 through 4 illustrate a bridge connector 28 that has been bolted to the center of bridge beam 27 and is connected to a small triangular bridge attachment 29 with a single aperture. In this embodiment, a cord, rope, bolt or rod could be passed through the aperture to aid lifting the CIPP liner feed roller using a crane. In other embodiments, the bridge attachment 29 may comprise multiple apertures or include any ancillary attachment requirements.

The frame 20 generally includes a support beam 60 that is connected to the left side plate 21 and the right side plate 24. In other embodiments, the support beam 60 may pass through the left side plate 21 and the right side plate 24 and be connected to the respective outer plates or outer panels 22, 25.

C. Main Roller

As best shown in FIG. 1, the CIPP liner feed roller generally comprises a main roller 30 that is connected to frame 20 and is coupled to a drive unit 50. The main roller 30 is attached to the left side plate 21 and the right side plate 24 in a manner that permits it to rotate relative to the frame 20 as directed by the drive unit 50. The drive unit 50 can generally control the direction that the main roller 30 rotates as well as the speed of its rotation. The main roller 30 generally comprises a high friction outer surface that tends to couple the motion of the CIPP liner 10 with the rotation of the main roller 30. In other words, the main roller 30 tends to pull the CIPP liner 10 in the direction of its rotation. In this embodiment, the main roller 30 generally spans the gap between the left side plate 21 and the right side plate 24. In other embodiments, the main roller 30 only partially spans this gap, or extends beyond the two side plates 21, 24 into the sides of frame 20.

D. Clamping Roller

Figure 2:
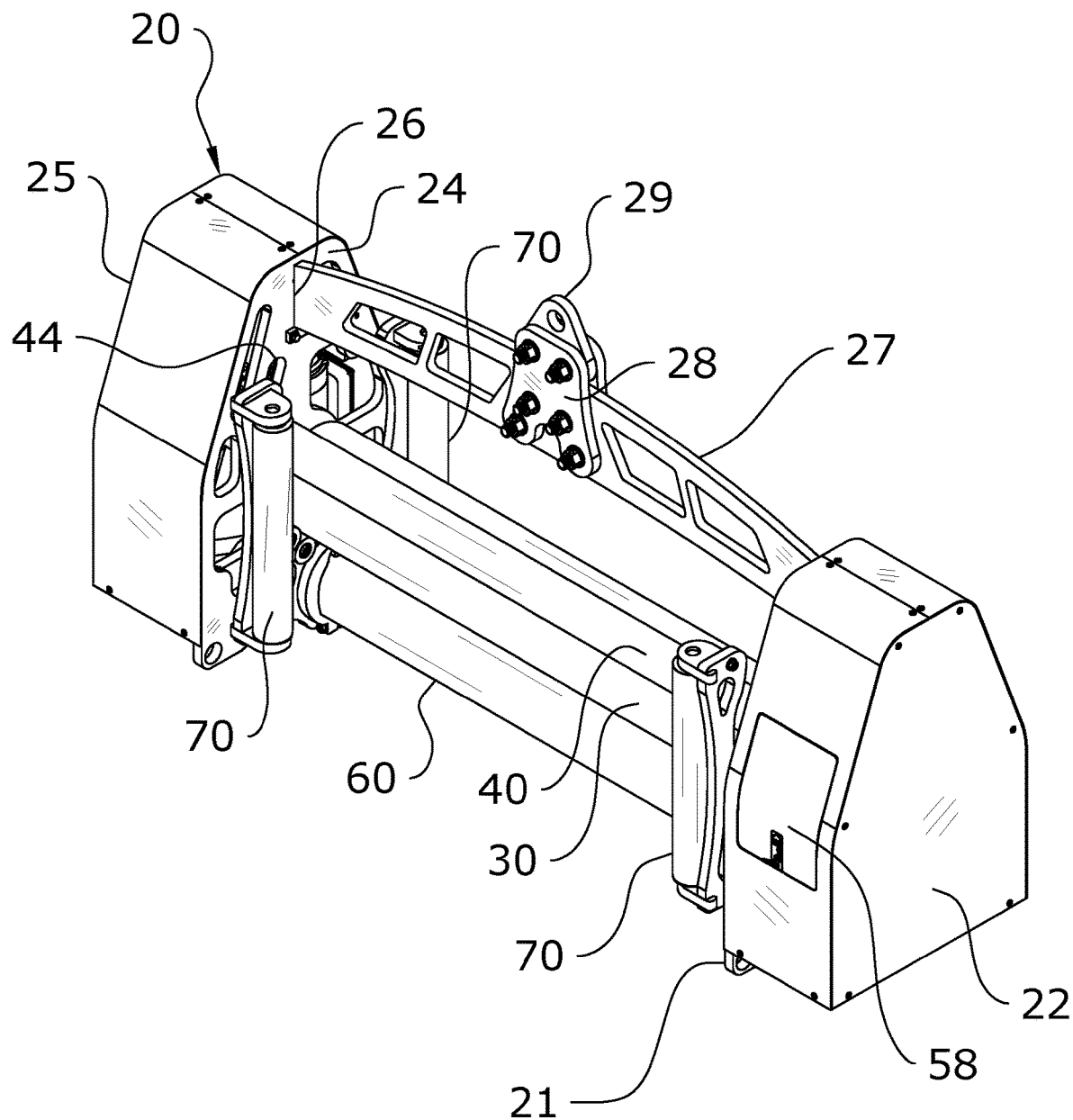
FIG. 2 is an alternate perspective view of a CIPP liner feed roller in accordance with an example embodiment.
Figure 3:
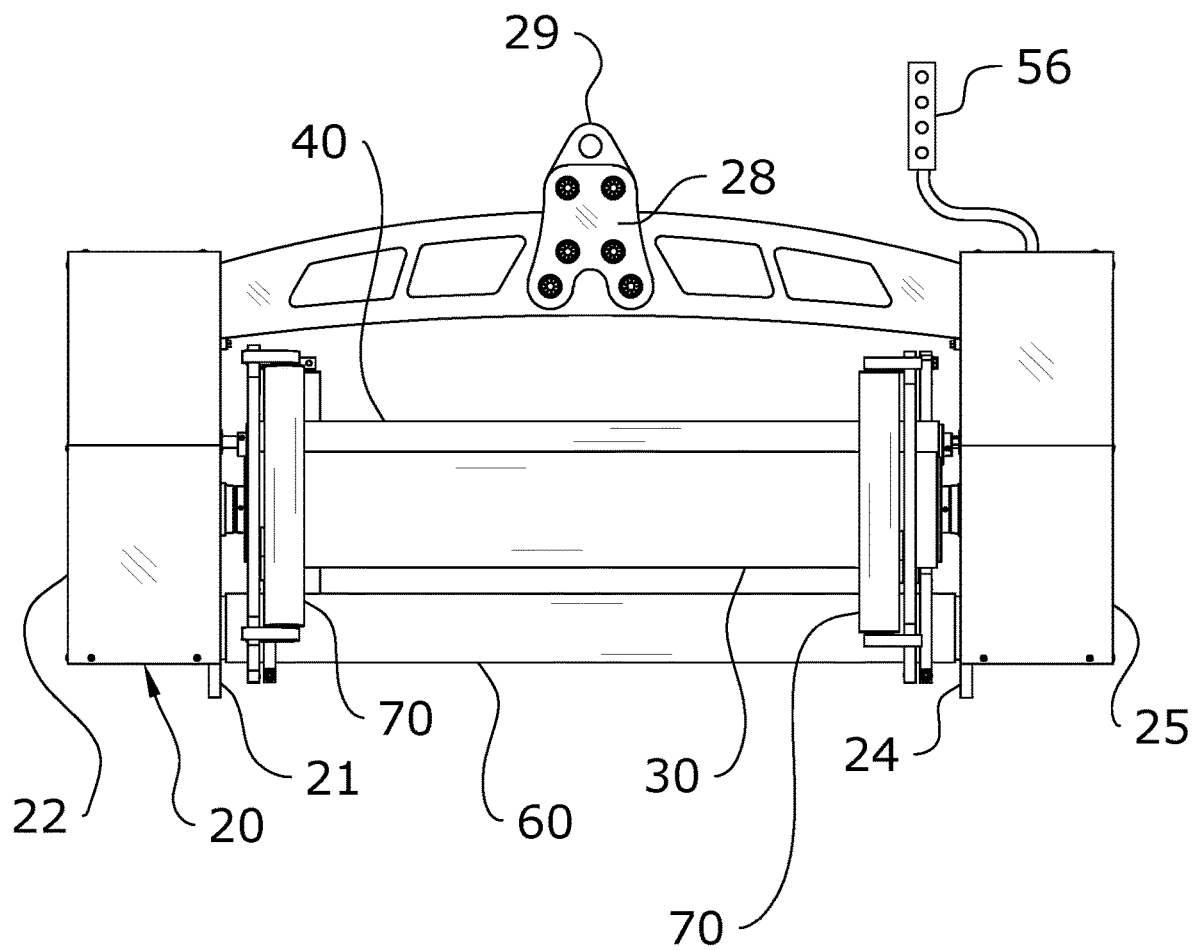
FIG. 3 is a front view of a CIPP liner feed roller in accordance with an example embodiment.
Figure 4:
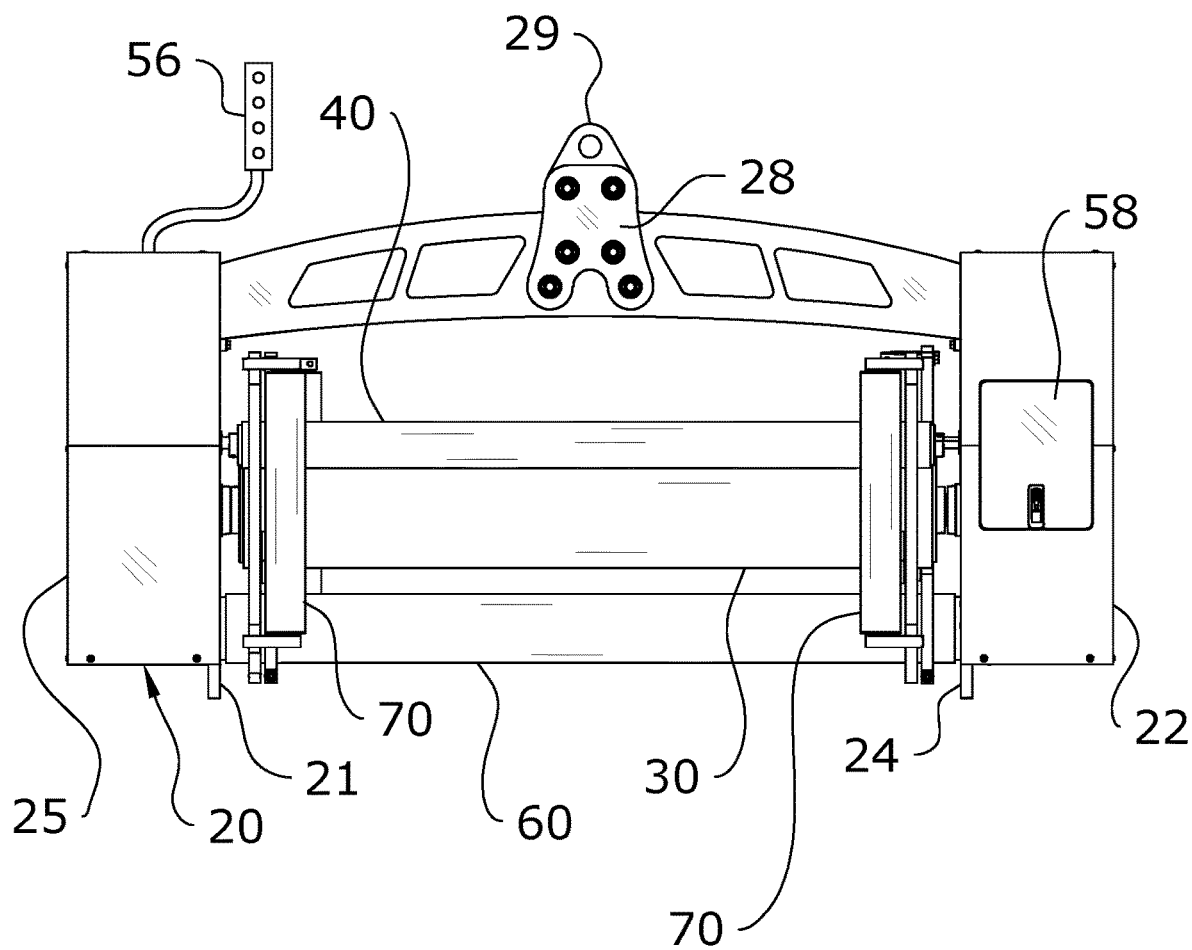
FIG. 4 is a rear view of a CIPP liner feed roller in accordance with an example embodiment.
Figure 5:
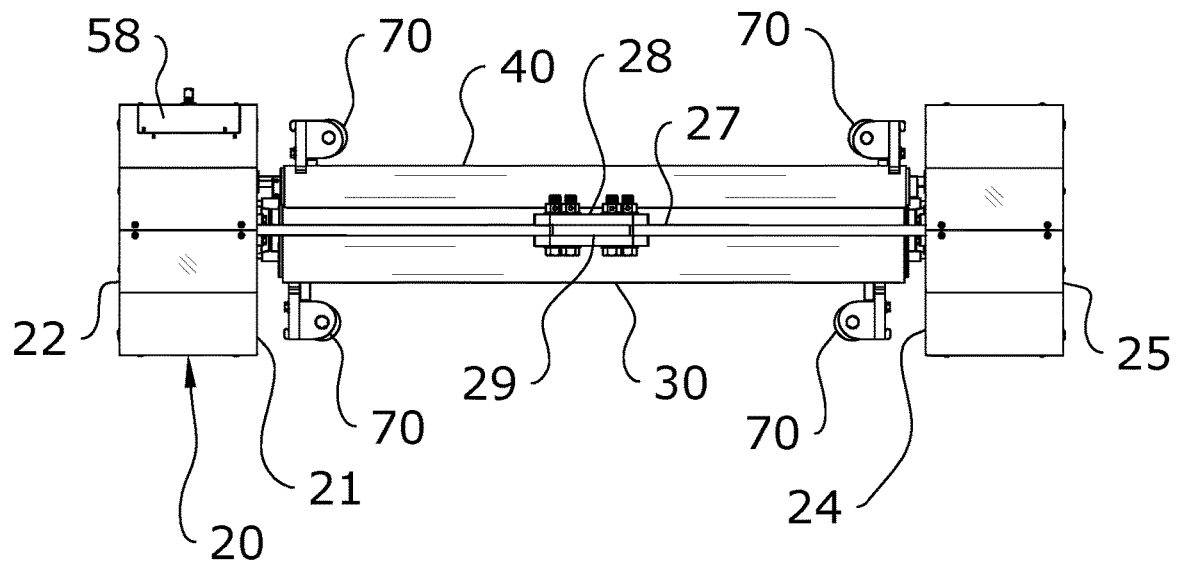
FIG. 5 is a top view of a CIPP liner feed roller in accordance with an example embodiment.
Figure 6:
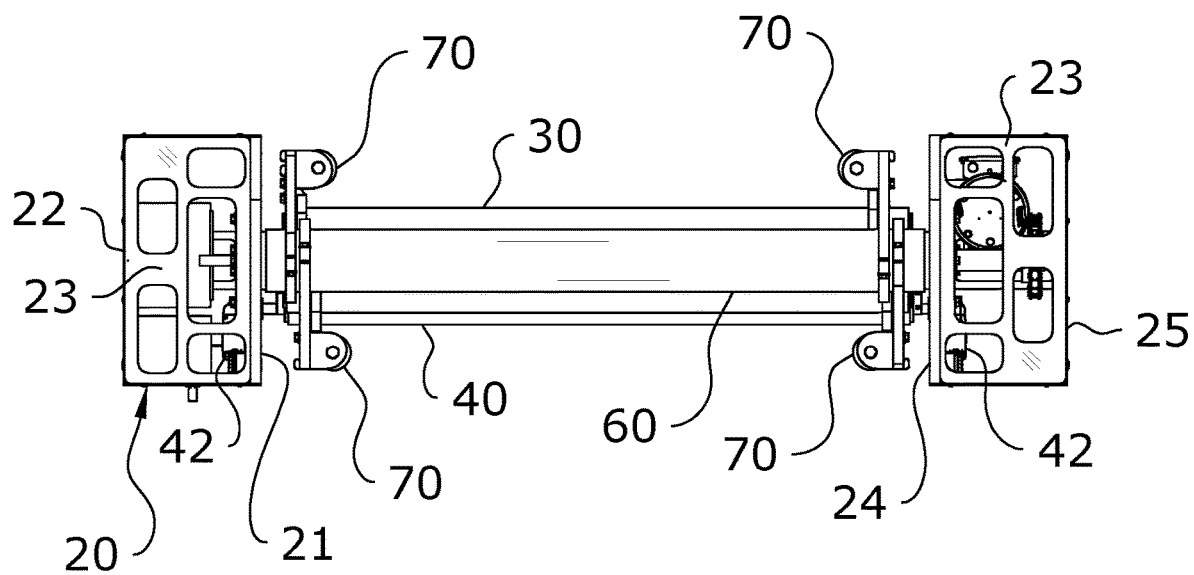
FIG. 6 is a bottom view of a CIPP liner feed roller in accordance with an example embodiment.
Figure 19:
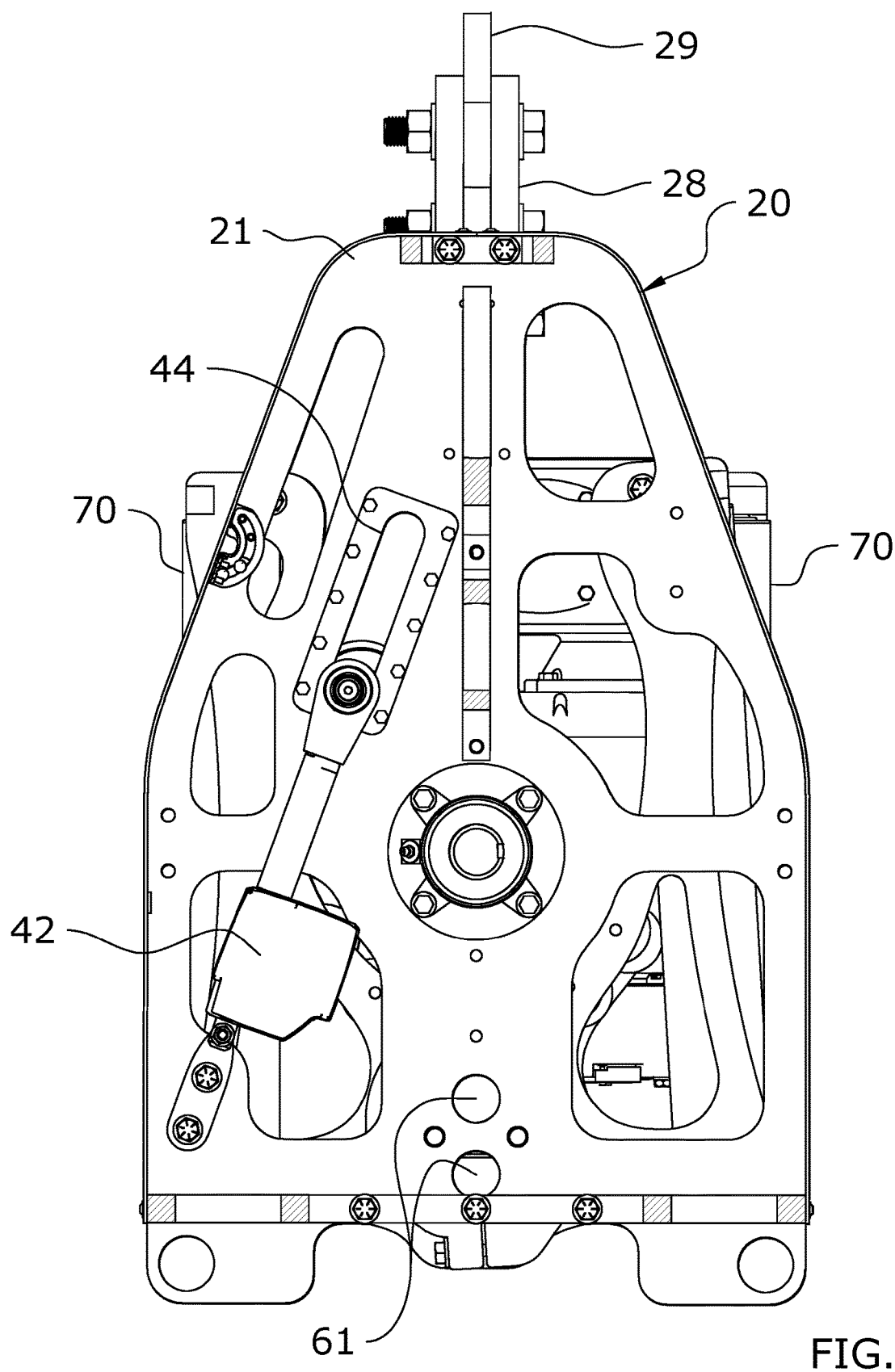
FIG. 19 is a left-side view of a CIPP liner feed roller in accordance with an example embodiment that features the left side plate.
Figure 20:
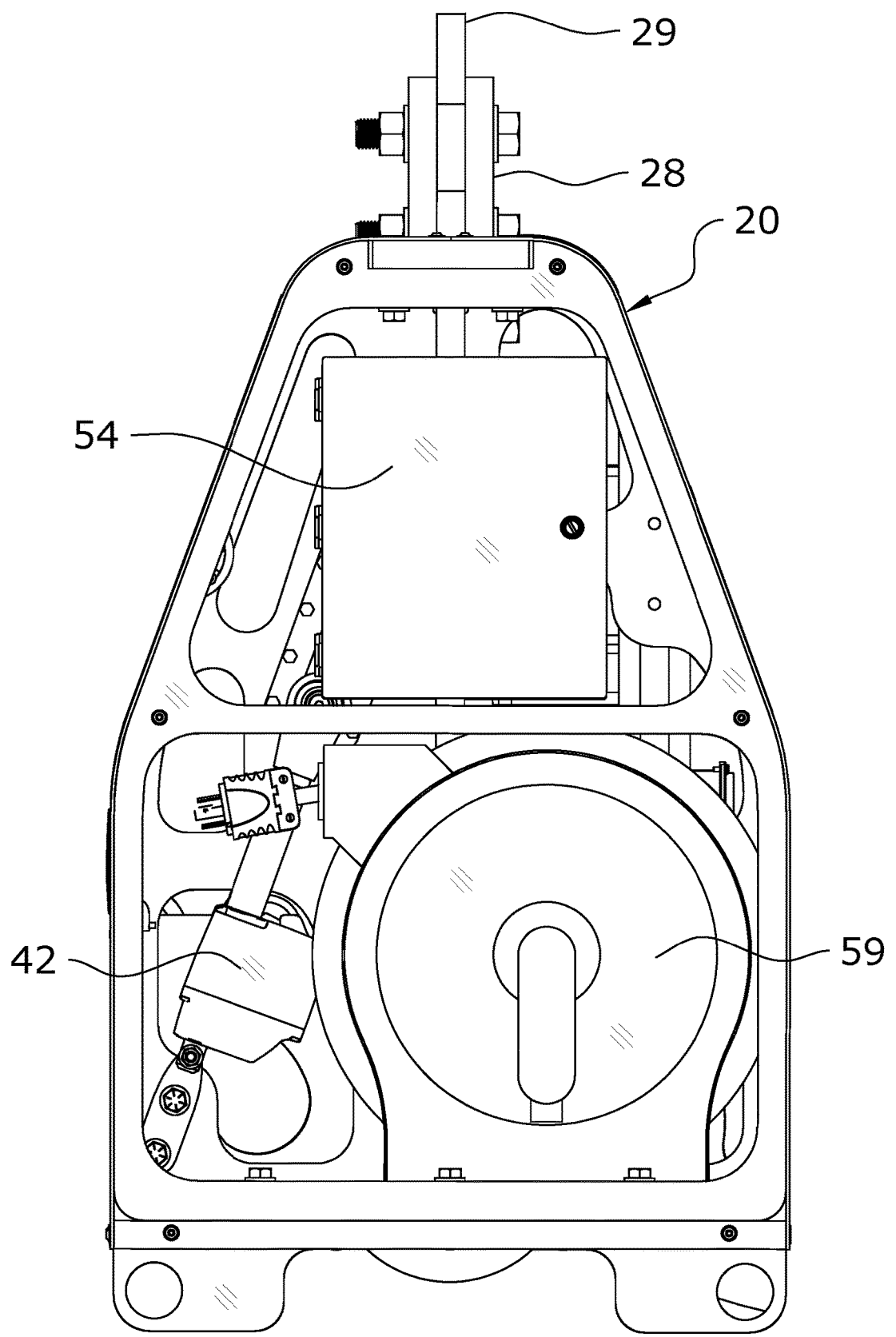
FIG. 20 is a left-side view of a CIPP liner feed roller in accordance with an example embodiment with the left side panel removed.

As best shown in FIG. 2, the CIPP liner feed roller generally comprises a clamping roller 40 that is connected to the left side plate 21 and the right slide plate 24. The clamping roller 40 is mounted in parallel to the main roller 30 and is configured in a manner that permits the spacing between the clamping roller 40 and the main roller 30 to be adjusted. This is generally controlled by one or more actuators 42 that cause the clamping roller 40 to move within a clamping roller slot 42 contained within left side plate 21 or right side plate 24, as shown in FIG. 19. Generally, the clamping roller 40 is configured to permit its spacing to vary between minimal contact with the main roller 30 and the maximum expected thickness of CIPP liner 10 to be fed through the CIPP liner feed roller. However, if the left side plate 21 and right side plate 24 are configured to accommodate multiple sizes of main rollers 30 and clamping rollers 40, the spacing may have different operational limits.

The clamping roller 40 generally comprises a high friction outer surface that tends to couple the rotation of the clamping roller 40 with the motion of CIPP liner 10 in contact with it. However, the clamping roller 40 is generally configured to passively rotate relative to the frame 20. In other words, the clamping roller 40 is driven by the motion of the CIPP liner 10 as opposed to driving the motion of the CIPP liner 10. However, because the motion of CIPP liner 10 is controlled by the main roller 30, the clamping roller 40 can also be considered to be driven by the main roller 30 as well.

Although this embodiment utilizes a passive clamping roller 40, other embodiments of a CIPP liner feed roller may use a clamping roller 40 that actively controls the motion of CIPP liner 10 in conjunction with or in lieu of main roller 30.

During operation, CIPP liner 10 is pressed between the clamping roller 40 and the main roller 30. This increases the friction between the CIPP liner 10 and the main roller 30 which improves the ability of the main roller 30 to control the motion of CIPP liner 10. This also acts to compress CIPP liner 10 as it is fed through the CIPP liner feed roller, which will tend to crease any folds within CIPP liner 10 and/or smooth out any undesirable folds or other surface characteristics of CIPP liner 10. The precise pressure between the clamping roller 40 and main roller 30 can be adjusted by actuators 42 in accordance with the needs of the particular task performed by CIPP liner feed roller.

In other embodiments of a CIPP liner feed roller, both the clamping roller 40 and main roller 30 may be moved by actuators. In other embodiments, the clamping roller 40 may include springs, suspensions, or other components that affect the position of the clamping roller 40. This effect may be applied directly to the clamping roller 40 or indirectly via one or more of the actuators 42. In some embodiments, the clamping roller 40 or actuators 42 include one or more switches or sensors that affect the movement of the clamping roller 40.

E. Support Beam

As shown in FIGS. 1 through 15 and 17 through 30, a CIPP liner feed roller generally includes a support beam 60 that spans the gap between the left side of the frame 20 and right side of frame 20. The support beam 60 is generally configured to be in parallel with the main roller 30 and clamping roller 40. This configuration aids the attachment of accessories that interact with CIPP liner 10 as it is fed into or fed out of the CIPP liner feed roller. In one embodiment, the support beam 60 is configured below the main roller 30 and clamping roller 40. However, the support beam 60 is not limited to this location. The support beam 60 generally has a uniform cylindrical shape that enables accessories attached to the support beam 60 to be repositioned along its length as well as rotated around its central axis. However, a support beam 60 with a different geometric configuration would still be suitable for use with a CIPP liner feed roller.

The support beam 60 generally contains a passage that permits the routing of cables from the left side of the frame 20 to the right side of the frame 20. This passage in the support beam 60 permits the routing of power and/or control signals between the sides of the CIPP liner feed roller without exposing any such cables or wires to the outside environment.

F. Accessories

The support beam 60 is configured to permit the attachment of one or more accessories to the CIPP liner feed roller. These accessories may add functionality to the CIPP liner feed roller, such as the ability to operate free-standing. These accessories may alter the functionality of the CIPP liner feed roller, such as modifying the manner in which the CIPP liner 10 flows into or out of the CIPP liner feed roller.

Figure 10A:
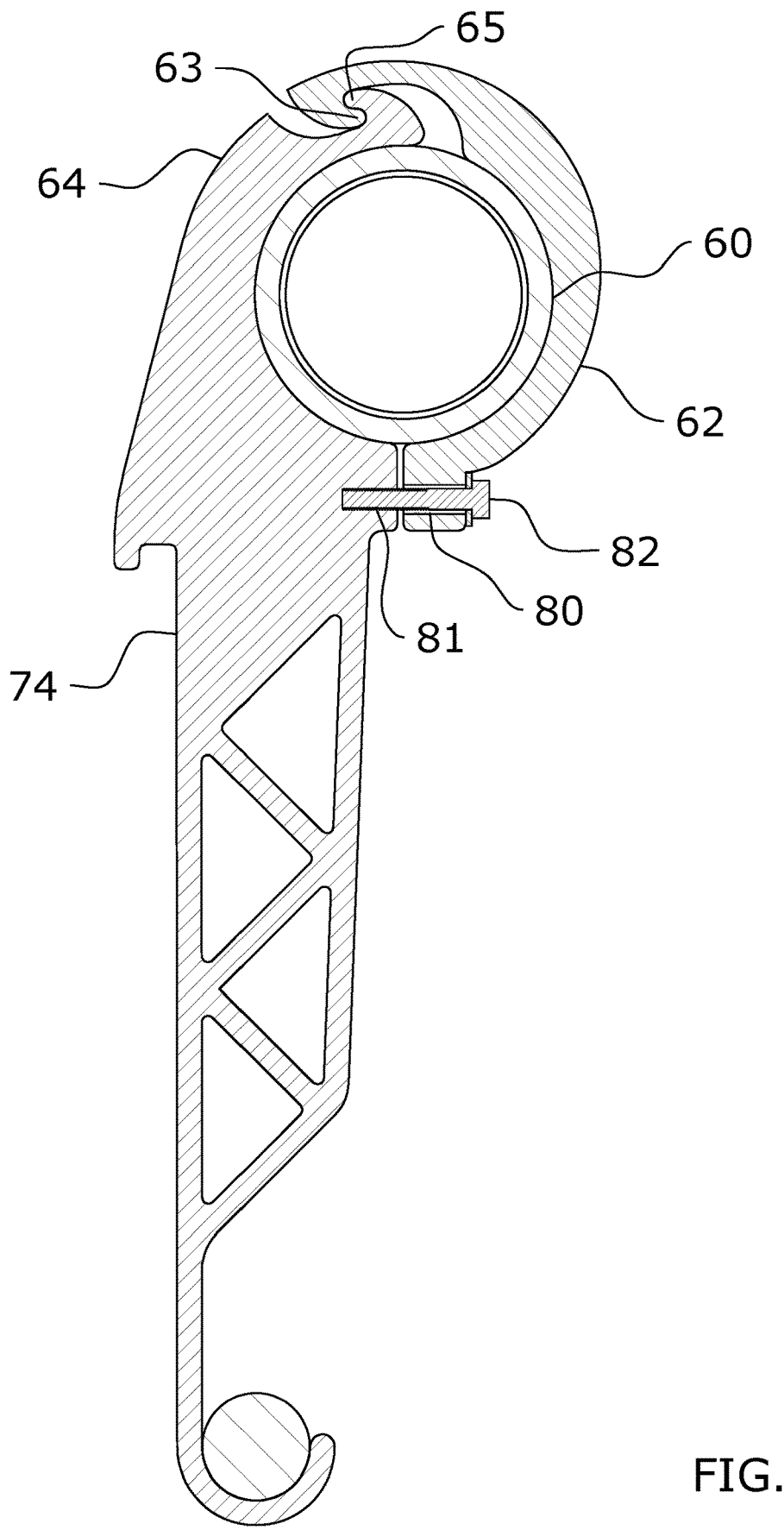
FIG. 10a is a cross-section view of a support connector and accessory connector that have been coupled to a support beam using a connector bolt.
Figure 10B:
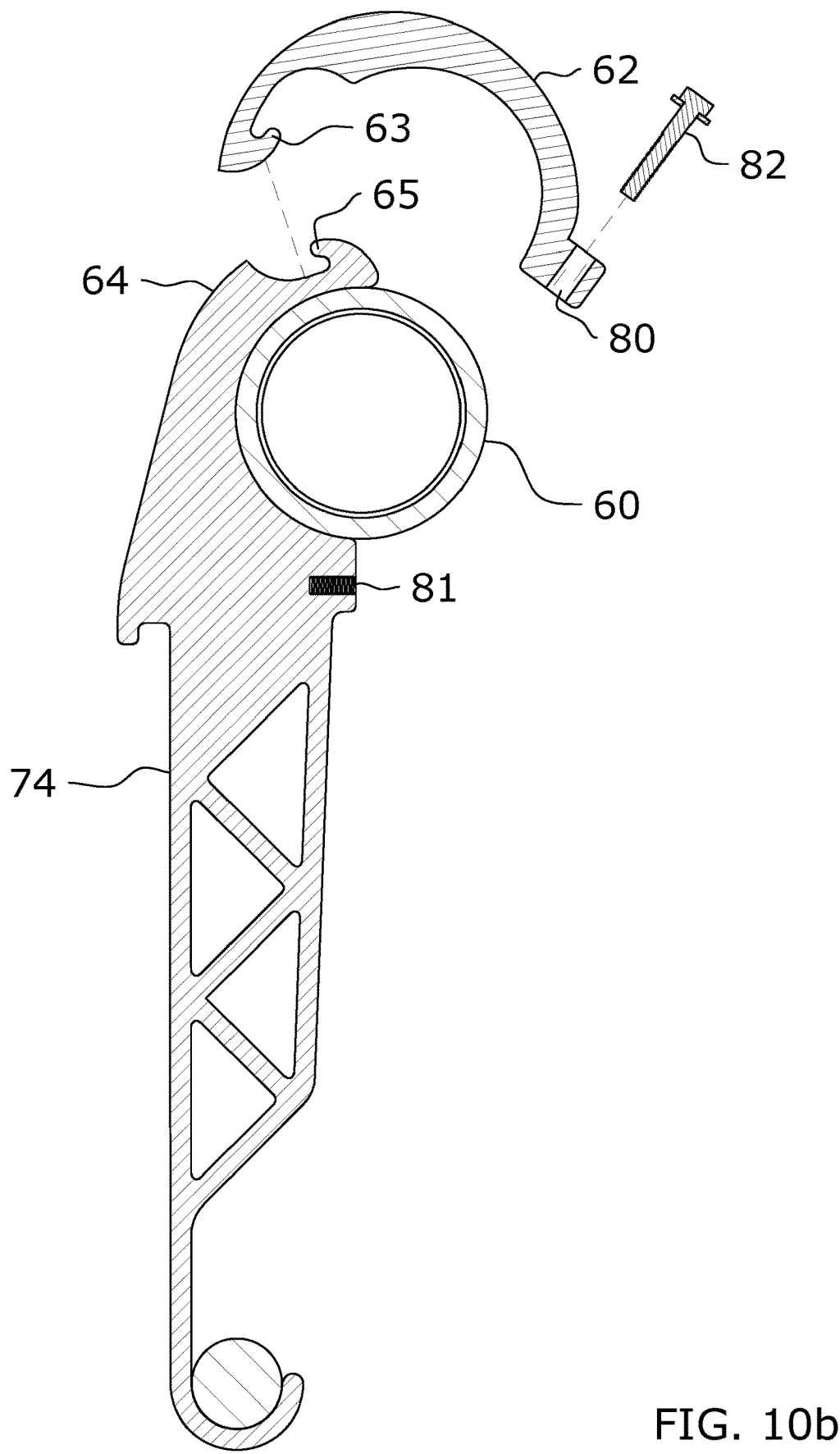
FIG. 10b is a cross-section of a support connector and accessory connector that are in the process of being coupled to a support beam using a connector bolt.

Accessories are generally attached to the CIPP liner feed roller using the combination of a support connector 62 and an accessory connector 64. FIGS. 10*a* and 10*b* illustrate an embodiment of a support connector 62 and an accessory connector 64 that are configured to allow the attachment of an accessory to a cylindrical support beam 60. The accessory shown in FIGS. 10*a* and 10*b* is a secondary material holder 74, but the same general concepts apply to other accessories as described herein. To the extent that the support beam 60 does not have a cylindrical shape, the support connector 62 and accessory connector 64 will have a complementary shape that enables attachment to it. The coupling of the accessory connector 64 and support connector 62 is not limited to the use of hooks, such as the support connector hook 63 and accessory connector hook 65.

In one embodiment, the support connector 62 comprises a support connector hook 63 and a support connector opening 80 configured to receive a connector bolt 82. The support connector hook 63 is configured to interlock with an accessory connector hook 65 on an accessory connector 64. The coupling of the accessory connector 64 and support connector 62 is not limited to the use of hooks, such as support connector hook 63 and accessory connector hook 65. Although, the accessory connector 64 shown in FIGS. 10*a* and 100*b* is an integral part of secondary material holder 74, the portion that is nearest the support connector 62 and support beam 60 can be considered the accessory connector 64. In addition to accessory connector hook 65, the accessory connector 64 generally comprises an accessory connector opening 81 that is configured to threadably attach to a connector bolt 82 that is disposed within the support connector opening 80.

As shown in FIG. 10*b*, the accessory connector 64 and the support connector 62 are generally two separated pieces. A secondary material holder 74 can be attached to a support beam 60 by interlocking hooks 63, 65 around the circumference of the support beam 60. In this embodiment of attaching an accessory to the support beam 60, a curved portion of the accessory connector 64 is placed in contact with the support beam 60. The support connector 62 is then coupled to the support beam 60 and accessory connector 64 by interlocking the support connector hook 63 with the accessory connector hook 65. The support connector 62 can then be fitted around the support beam 60, such that the accessory connector opening 81 and the support connector opening 80 are aligned. Once the openings 80, 81 are aligned, a connector bolt 82 can be fed through the support connector opening 80 and screwed into accessory connector opening 81.

The strength of the connection between the accessory connector 64, the support connector 62 and the support beam 60 is controlled by the tightening or loosening of the connector bolt 82. Thus, when the connector bolt 82 is sufficiently tightened, the connectors 62, 64 are prevented from sliding along the length of the support beam 60 or rotating around its central axis. However, if the connector bolt 82 is sufficiently loosened, the connectors 62, 64 can be repositioned on the support beam 60 (sliding or rotating) without being detaching from each other or the support beam 60. In some embodiments, the support connector 62 and the accessory connector 64 contain a high-friction surface on the portions that contact support beam 60.

The accessory connector 64 shown in FIGS. 10*a* and 10*b* can be used as a basis for other accessories, including, but not limited to, those shown in FIGS. 11 through 15. In some embodiments, the shape of the support connector 62 is the same for all accessories. In these embodiments, all accessories will use the same shape for accessory connector 64. In other embodiments, each accessory may utilize a different support connector 62 that is configured to couple only with that particular accessory. Such differences might include the circumference distribution of the connectors 62, 64 around the support beam 60. In FIGS. 10a and 10b, the circumference of the support beam 60 is roughly split evenly between the connectors 62, 64. However, a different split is also suitable for use with the support beam 60. In some embodiments, the combination of the support connector 62 and the accessory connector 64 does not span the entire circumference of the support beam 60. Furthermore, the accessory connector 64 and support connector 62 may be comprised of multiple pieces that collectively provide attachment to the support beam 60. Moreover, when multiple accessories are used simultaneously, it is possible for each accessory to use different accessory connectors 64 and support connectors 62 yet still be compatible with each other and the support beam 60.

Figure 9:
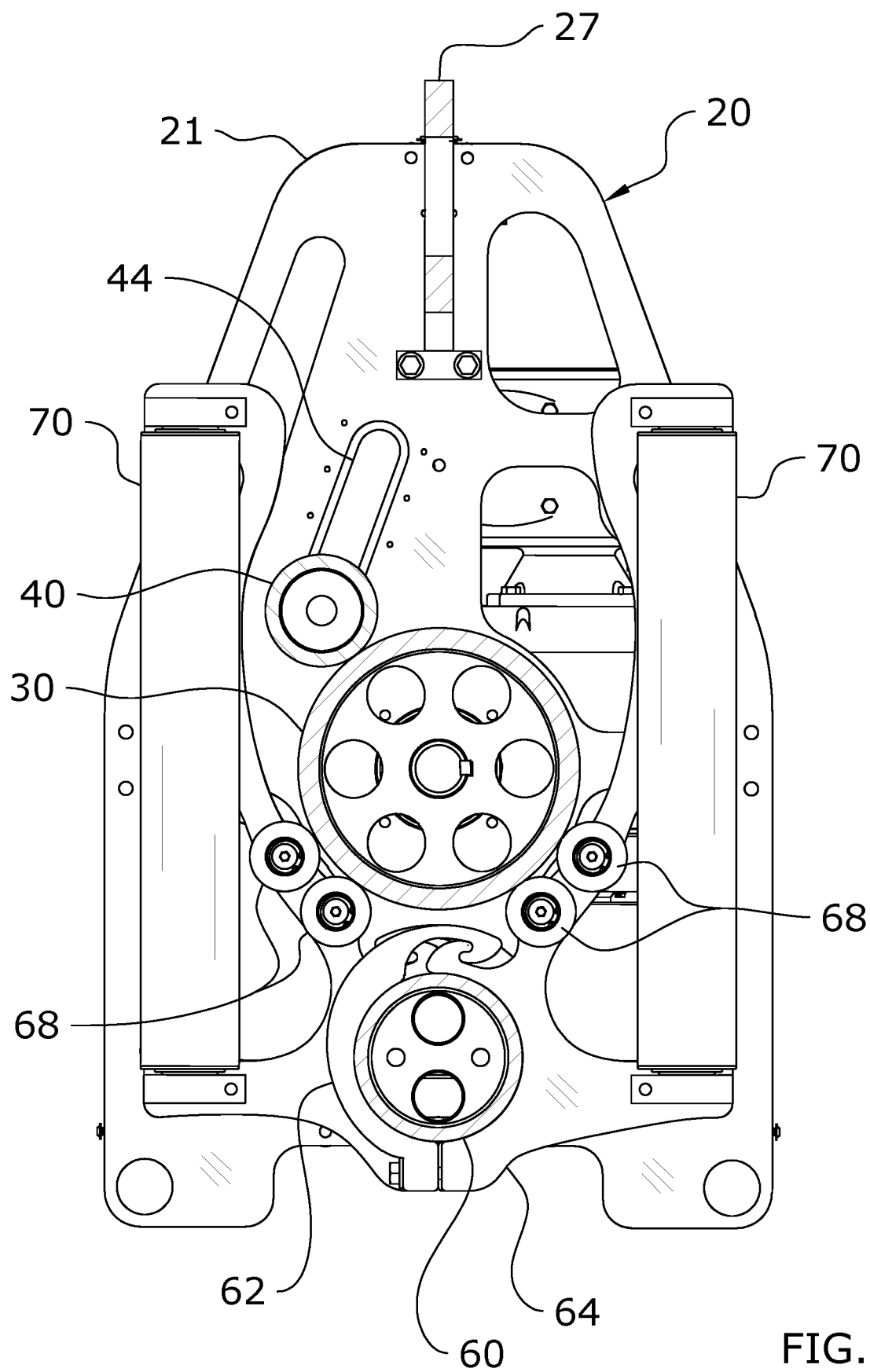
FIG. 9 is a right-side cross-section view of a CIPP liner feed roller in accordance with an example embodiment.

Some accessories utilize connector wheels 68, as shown in FIG. 9. The connector wheels 68 are intended to passively rotate when in contact with the main roller 30 and serve to create a minimum separation between an accessory and the main roller 30. This is generally the case for accessories that interact directly with CIPP liner 10 before or after it is fed through the CIPP liner feed roller. The use of connector wheels 68 may also apply to accessories that are sufficiently close to the main roller 30 that there is a significant risk of unintentional contact. In lieu of or in conjunction with connector wheels 68, inadvertent contact with a moving part of the CIPP liner feed roller could include mechanical structures that contact other portions of the CIPP liner feed roller.

Figure 14:
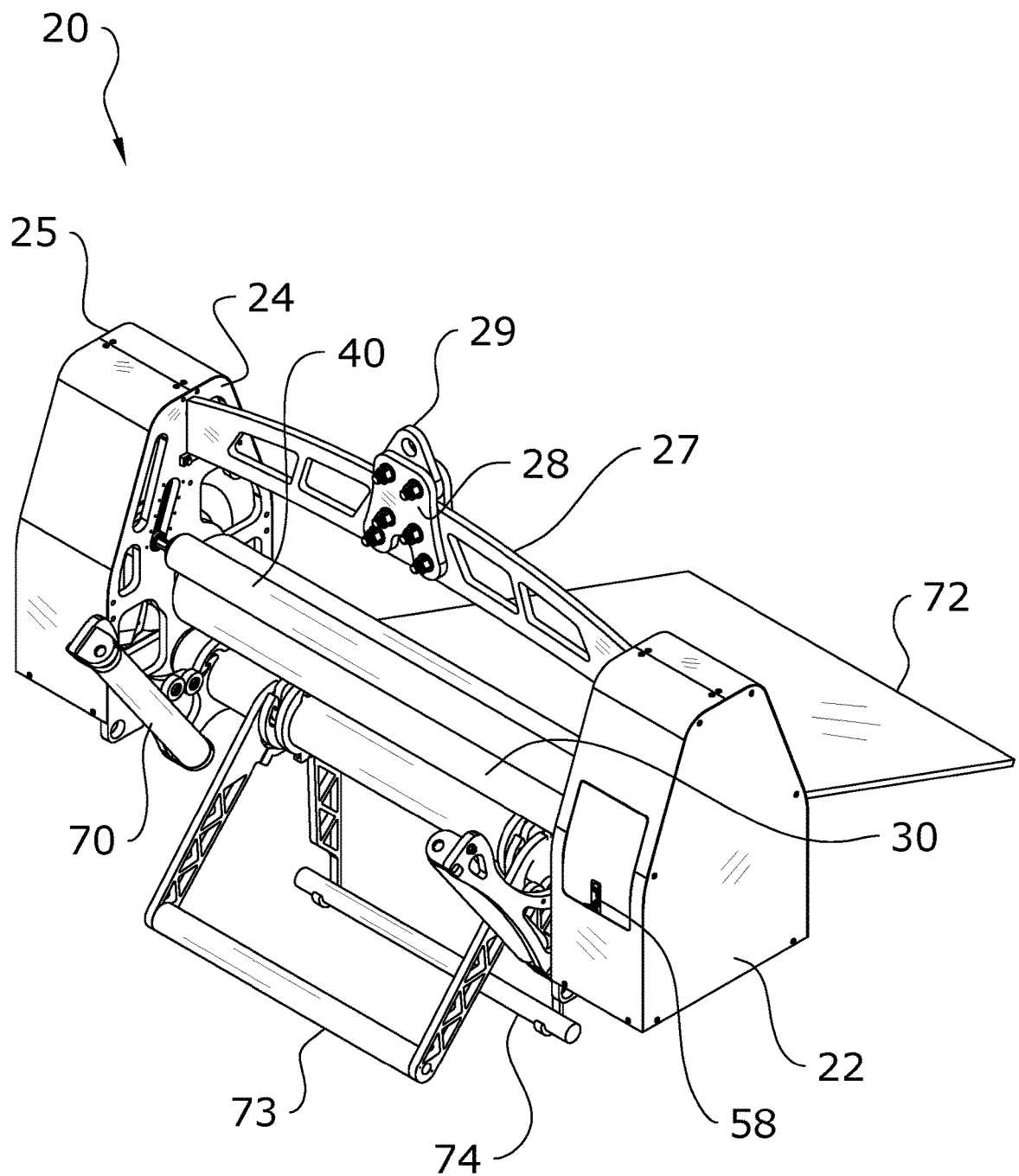
FIG. 14 is an alternate perspective view of a CIPP liner feed roller in accordance with an example embodiment that includes an infeed table, a secondary material holder, and a balance roller.
Figure 15:
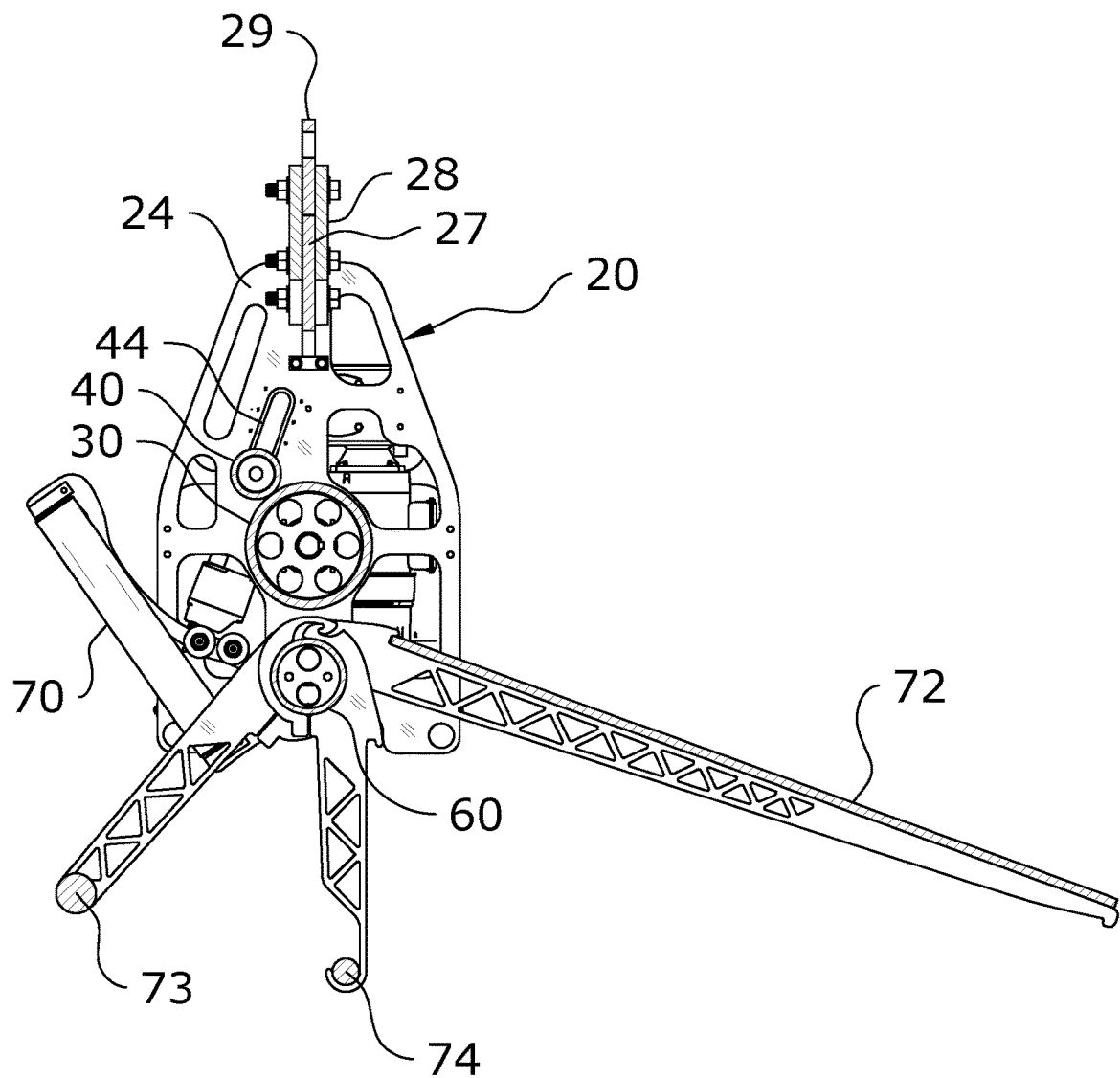
FIG. 15 is a left-side cross-section view of a CIPP liner feed roller in accordance with an example embodiment that includes an infeed table, a secondary material holder, and a balance roller.

A guide roller 70 is an example of an accessory that can be used with CIPP liner feed roller. FIG. 9 illustrates one embodiment of a guide roller 70 that includes connector wheels 68. Generally, guide rollers 70 control the position of CIPP liner 10 as it is being fed into or fed out of the CIPP liner feed roller. For example, if the CIPP liner feed roller is being used to fold CIPP liner 10, guide rollers 70 on the outflow side of CIPP liner feed roller can be used to maintain the lateral alignment of folded CIPP liner 10 relative to the main roller 30. Generally, this will be aligned with the center of the main roller 30. Guide rollers 70 can be used to prevent CIPP liner 10 from contacting the left side plate 21 and the right side plate 24. Guide rollers 70 can also be used to direct the outflow of CIPP liner 10 a desired location. As shown in FIGS. 14 and 15, guide rollers 70 can be rotated around the central axis of the support beam 60 to accommodate the CIPP liner 10 that is being pushed out of the CIPP liner feed roller in a downwards direction. Because of their adjustable rotation, guide rollers 70 generally include connector wheels 68 to prevent inadvertent contact with the main roller 30.

Figure 11:
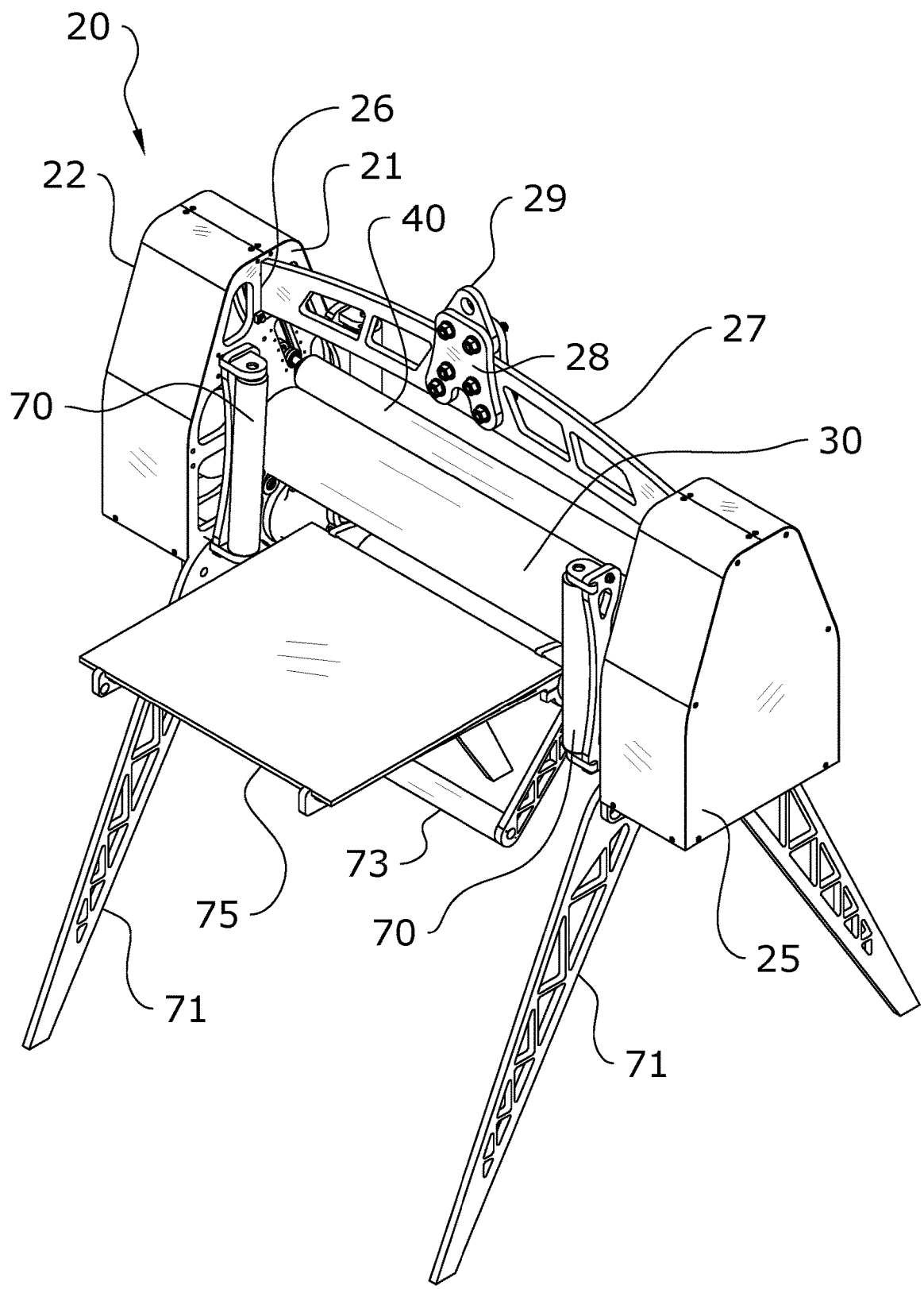
FIG. 11 is a perspective view of a CIPP liner feed roller in accordance with an example embodiment that includes support legs, a work platform, and a balance roller.
Figure 12:
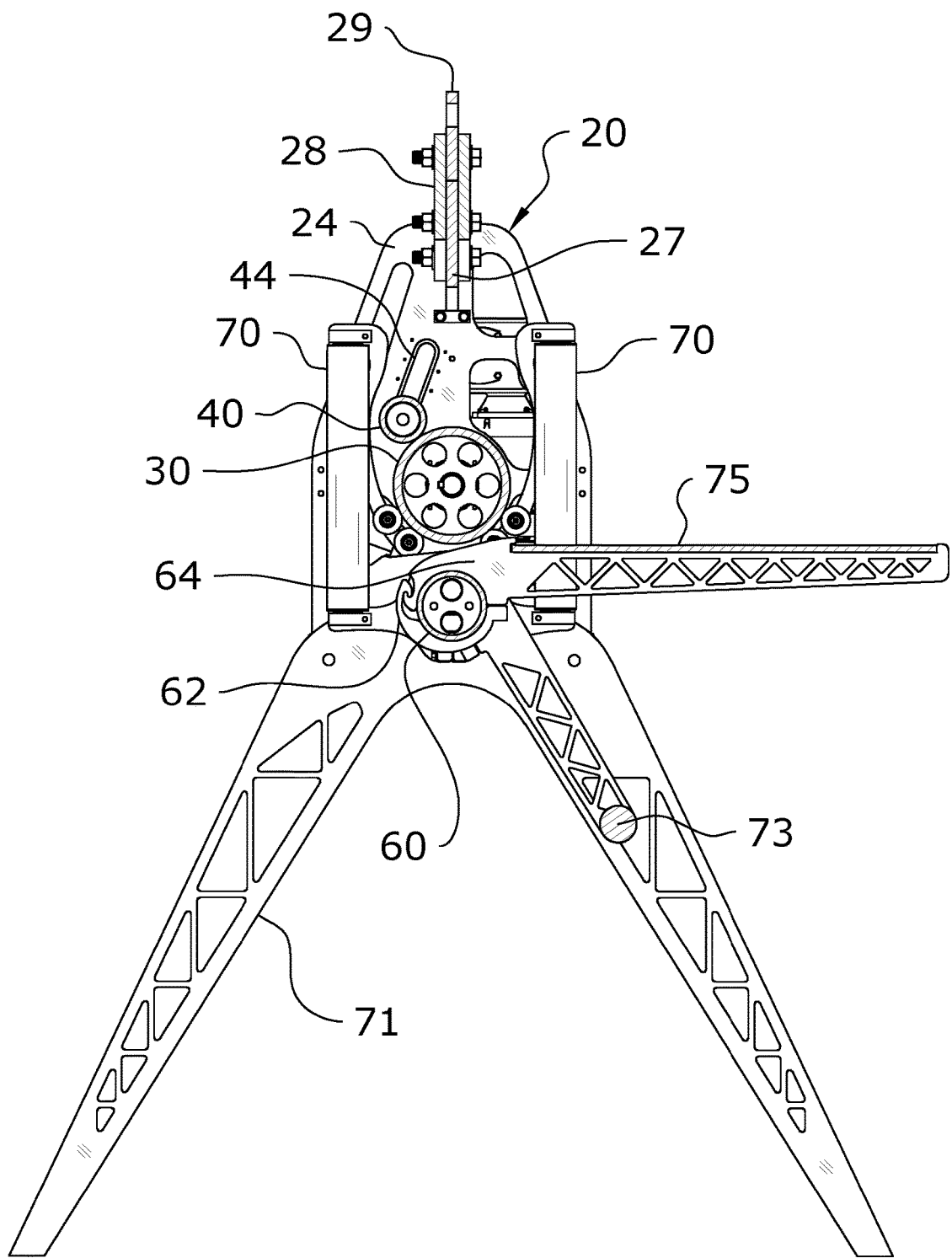
FIG. 12 is a right-side cross-section view of a CIPP liner feed roller in accordance with an example embodiment that includes support legs, a work platform, and a balance roller.

Support legs 71 are another example of an accessory that can used with the CIPP liner feed roller. As shown in FIGS. 11 and 12, support legs 71 are generally configured to support the weight of the CIPP liner feed roller, including any accessories that might be attached. In addition to the weight of the CIPP liner feed roller, support legs 71 are generally configured to account for any forces caused by the process of feeding CIPP liner 10 through the CIPP liner feed roller. For example, rotation of the main roller 30 in one direction will exert a rotational force on frame 20 in the opposite direction. To prevent the frame 20 from actually rotating in response to the rotation of the main roller 30, the support legs 71 should accommodate this force. Support legs 71 are generally comprised of an accessory connector 64 attached to two legs arranged at an angle. The support legs 71 shown in FIG. 11 are designed to work in a pair with one set of support legs 71 adjacent to the left side plate 21 and another set of support legs 71 adjacent to the right side plate 24. In other embodiments, support legs 71 can be comprised of a single structure. In other embodiments, support legs 71 are located at intermediate positions that are not adjacent to either the right side plate 24 or the left side plate 21. Such intermediate positions may be in addition to or in lieu of support legs 71 located next to a left side plate 21 or right side plate 24.

Figure 26:
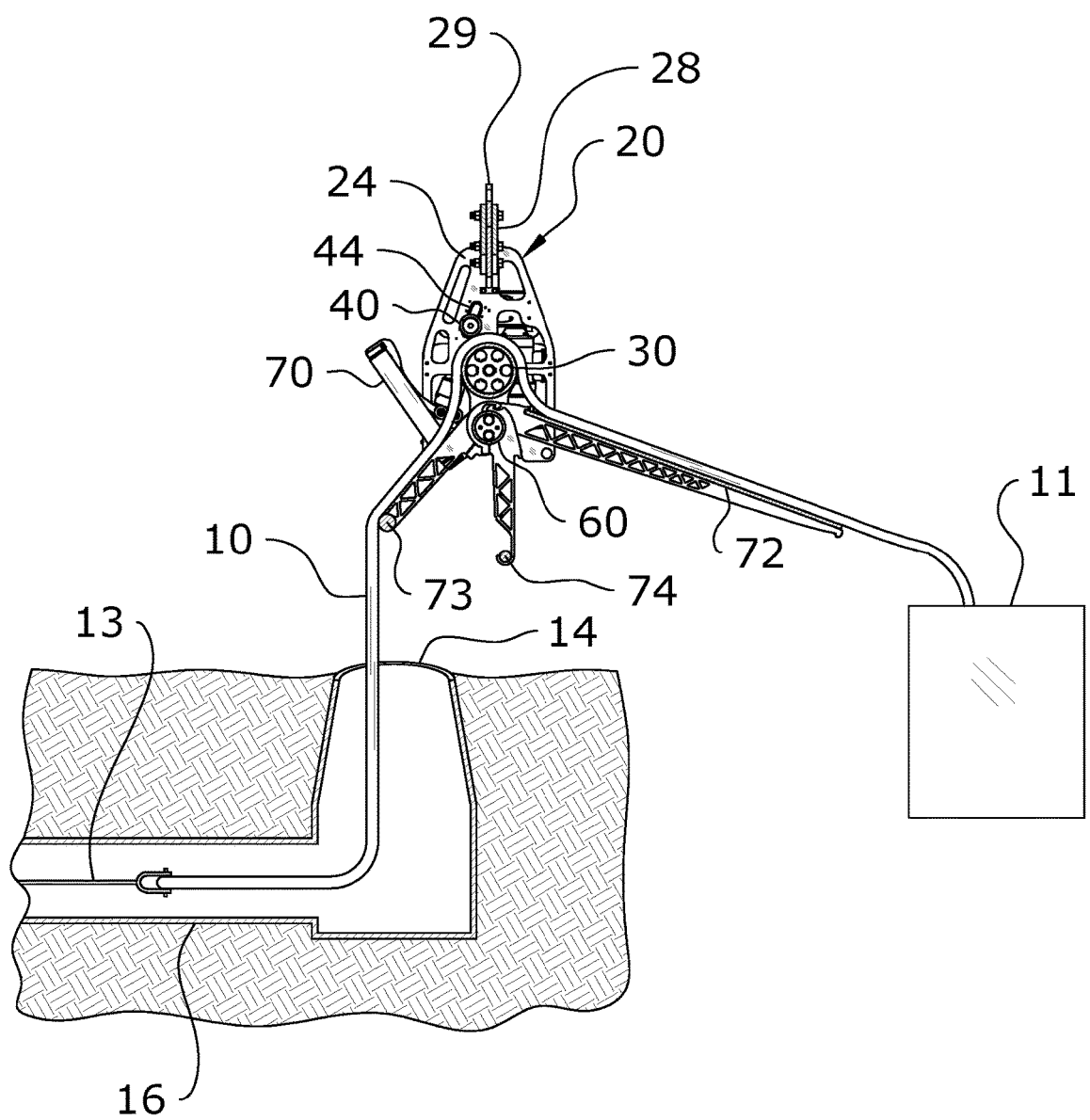
FIG. 26 is a left-side cross-section view illustrating a CIPP liner feed roller in accordance with an example embodiment being used to insert CIPP liner into an access opening.

An infeed table 72 is another example of an accessory that can be used with the CIPP liner feed roller. As shown in FIG. 15, the infeed table 72 controls the angle and shape of CIPP liner 10 as it is pulled into the CIPP liner feed roller. In general, the infeed table 72 causes CIPP liner 10 to be fed into the CIPP liner feed roller from the side as opposed to from below. The infeed table 72 also tends to flatten out the CIPP liner 10 before it is pulled into the CIPP liner feed roller. For example, as shown in FIG. 26, when the CIPP liner 10 is being fed from a liner box 11 that is at a lower elevation than the CIPP liner feed roller, the infeed table 72 forces the CIPP liner 10 to contact the main roller 30 at a higher angle. The infeed table 72 may also be used in conjunction with guide rollers 70 to further control the infeed characteristics of the CIPP liner 10.

As shown in FIGS. 22 through 25, a folding roller assembly 90 is another example of an accessory that can be used with the CIPP liner feed roller. In some embodiments, the CIPP liner 10 is fed out of the CIPP liner feed roller with its sides folded inward. A folding roller assembly 90 aids in the process of folding the CIPP liner 10 as it is being fed out of the CIPP liner feed roller. By curling the ends of CIPP liner 10 before it reaches the main roller 30 and clamping roller 40, the process of pushing out folded CIPP liner 18 encounters fewer errors.

The folding roller assembly 90 generally comprises a folding roller base 91 with three pairs of folding rollers: a first set folding rollers 92, a second set of folding rollers 93, and a third set of folding rollers 94. In the embodiment shown in FIGS. 22 through 25, the three sets of folding rollers 92, 93, 94 are at three different angles relative to the main roller 30 with each member of a set of folding rollers being a mirror image of the other. The folding roller assembly 90 also includes two sets of horizontal rollers: inflow horizontal rollers 95 and outflow horizontal rollers 96 that are configured to be in parallel to the main roller 30.

The inflow horizontal rollers 95 support CIPP liner as it passes through the folding roller assembly 90 to ensure that it contacts and is modified by the sets of folding rollers 92, 93, 94. Each member of the first set of folding rollers 92 is generally tilted upwards and towards each other at an angle that is between parallel with the main roller 30 (0 degrees) and perpendicular with the main roller 30 (90 degrees). Each member of the first set of folding rollers 92 is usually tilted upwards at the same angle as the other relative to parallel with the main roller 30. The first set of rollers 92 generally curls the ends of the CIPP liner 10 and keeps it within certain boundaries. Each member of the second set of folding rollers 93 is generally tilted further towards each other than the corresponding member of the first set of folding rollers 92. Each member of the second set of folding rollers 93 may be configured to be perpendicular with the main roller 30. Each member of the second set of folding rollers 93 is usually tilted at the same angle as the other relative to parallel with the main roller 30. The second set of folding rollers 93 adds additional curl to the curl caused by the first set of rollers 92. Each member of the third set of folding rollers 94 is generally tilted further towards each other than the corresponding member of the second set of folding rollers 93. Each member of the third set of folding rollers 94 is generally titled towards each other at an angle that is between perpendicular with the main roller 30 (90 degrees) and parallel with the main roller 30 (180 degrees). Each member of the third set of folding rollers 94 is usually tilted at the same angle as the other relative to parallel with the main roller 30. The third set of folding rollers 94 generally pushes the edges of the CIPP Liner 10 downwards to create the beginnings of a fold in the CIPP liner 10.

The folding roller assembly 90 shown in FIGS. 22 through 25 is a unitary structure that incorporates two accessory connectors 64 that are connected to two support connectors 62. In other embodiments, the folding roller assembly 90 may have a single point of attachment or more than two. Different embodiments of the folding roller assembly 90 may also include a different configuration of folding rollers 92, 93, 94. Other embodiments of the folding roller assembly 90 utilize sets of folding rollers 92, 93, 94 wherein each member does not have the same angle as the other relative to parallel with the main roller 30. For example, if the CIPP liner 10 is to be folded in half, one member of a pair of folding rollers 92, 93, 94 may tilt inwards with the other member being perpendicular to the main roller 30. Furthermore, a greater number of folding rollers might be employed to further curl the CIPP liner 10 before it contacts the main roller 30, or curl the CIPP liner 10 more gradually.

The CIPP liner feed roller shown in FIGS. 11, 12, 14, 15, and 26 includes a balance roller 73. The balance roller 73 can be used to modify the direction of the CIPP liner 10 after it has been fed through the CIPP liner feed roller. For example, as shown in FIG. 26, in applications where the CIPP liner 10 will be fed into an access opening 14 below the elevation of the main roller 30, the balance roller 73 can be used to avoid having the outflow of CIPP liner 10 pull directly down on the main roller 30. This reduces the tendency for the CIPP liner feed roller to tip over and provides better control over the position of the outflow of CIPP liner 10. Generally, the balance roller 73 contains a passive roller with a high friction surface. As shown in FIG. 15, the rotation of the balance roller 73 along the central axis of the support beam 60 can be adjusted.

Figure 13:
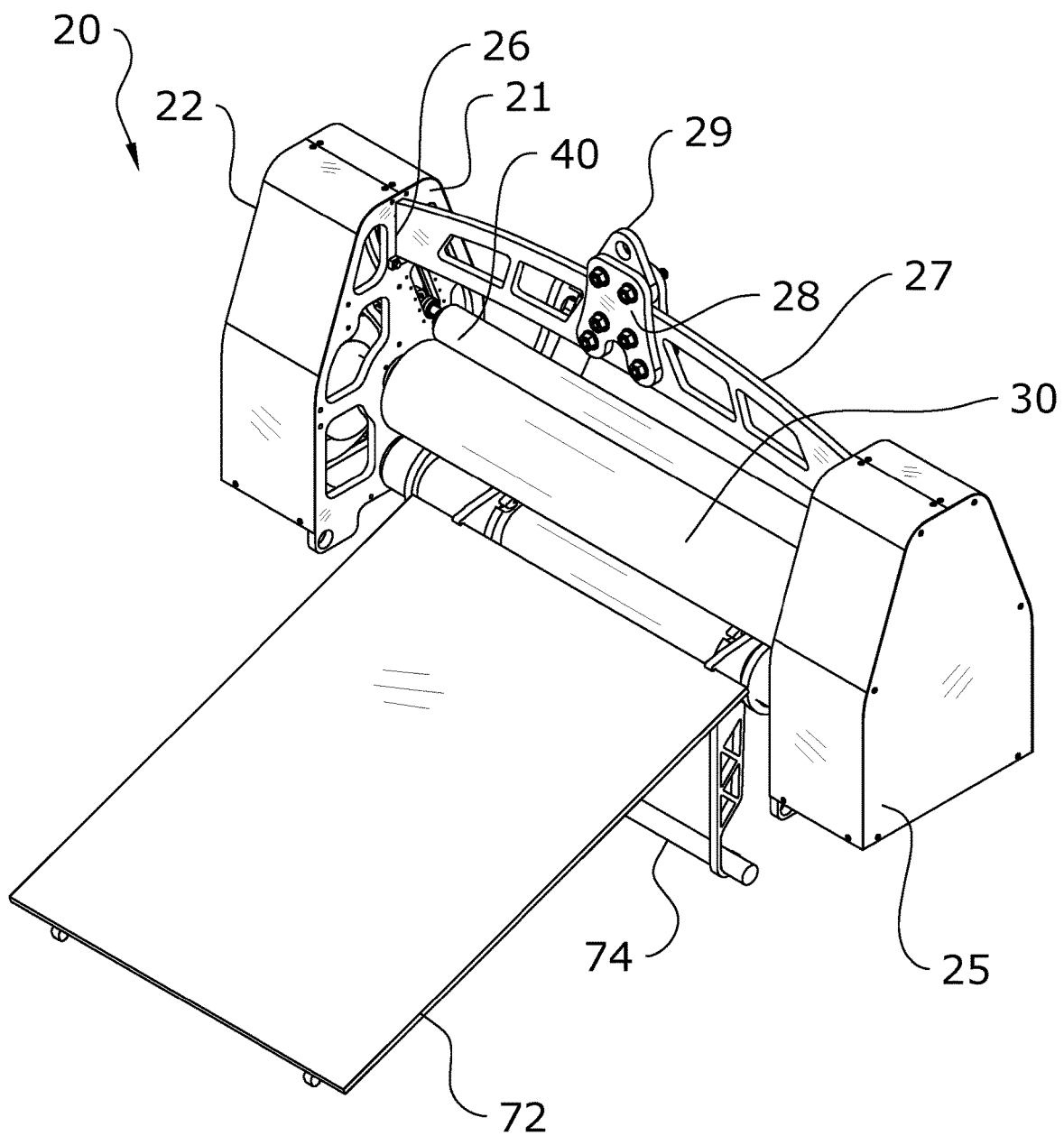
FIG. 13 is a perspective view of a CIPP liner feed roller in accordance with an example embodiment that includes an infeed table and a secondary material holder.

Other accessories that can be used with the CIPP liner feed roller include, but are not limited to, a secondary material holder 74 and a work platform 75. Embodiments including a work platform 75 are shown in FIGS. 11 and 12. Embodiments including a secondary material holder 74 are shown in FIGS. 13 through 15. Accessories for use with the CIPP liner feed roller, including, but not limited to, those described above can be used individually or in combination with other accessories. The support beam 60 is not inherently limited to a specific number or type of accessory connectors 64. For example, the embodiment shown in FIG. 15 includes an infeed table 72, guide rollers 70, a balance roller 73, and a secondary material holder 74. In addition to the accessories shown, the embodiment shown in FIG. 15 may also be able to accommodate support legs 71. To the extent that there is space along the length of the support beam 60 and sufficient clearance between other accessories and the CIPP liner feed roller itself, additional accessories can be used with the CIPP liner feed roller.

G. Drive Unit

The drive unit 50 generally includes a motor 51 and a controller 54. The drive unit 50 is coupled to the main roller 30 to control the rotation of the main roller 30. In one embodiment, the motor 51 is coupled to the main roller 30 using a chain 34 and a sprocket 32. The sprocket 32 is operatively coupled to the main roller 30 such that rotation of the sprocket 32 causes rotation of the main roller 30. The drive unit 50 is coupled to the controller 54, which receives signals from operator controls 56 and sends signals to the motor 51 and actuators 42 to control the rotation of the main roller 30 and the position of the clamping roller 40. In some embodiments, the motor 51 is coupled to a speed reducer 53.

In some embodiments, the drive unit 50 comprises a hydraulic motor. In other embodiments, the drive unit 50 comprises a variable speed breaking electric motor 51. In other embodiments, the drive unit 50 comprises a combination of electrical and hydraulic components. In other embodiments, a belt or series of gears is used in place of sprocket 32 and chain 34.

H. Controller

The CIPP liner feed roller generally comprises a controller 54 configured to receive signals from an operator and control the operation of inter alia drive unit 50, and one or more actuators 42. The controller 54 may be disposed within an enclosure and include one or more controller openings 55, which enable the routing of power or control signals into and out of the controller 54. These controller openings 55 can be used to feed power to accessories or other attachments, such as area lighting.

Figure 21:
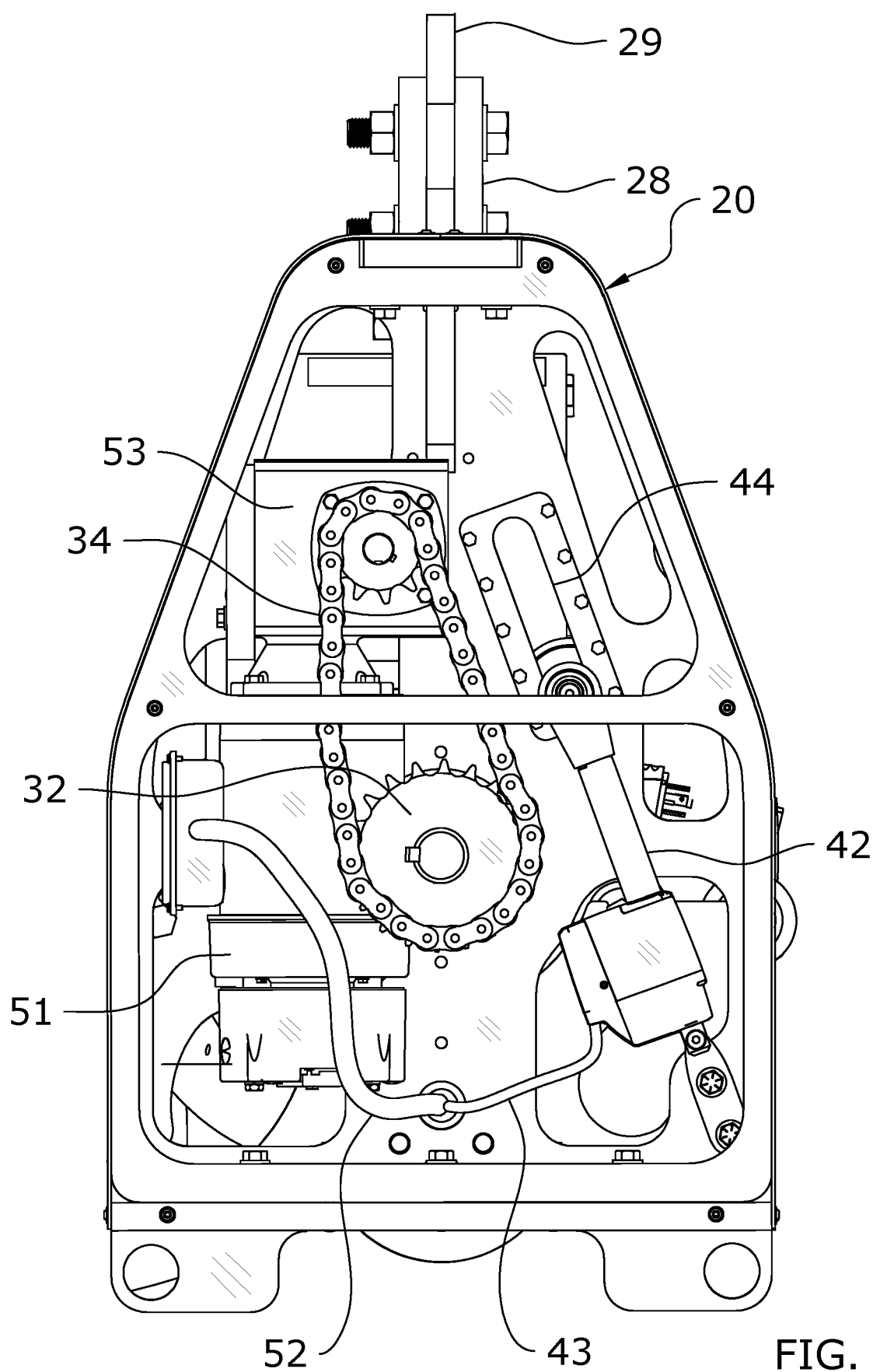
FIG. 21 is a right-side view of a CIPP liner feed roller in accordance with an example embodiment with the right side panel removed.
Figure 22:
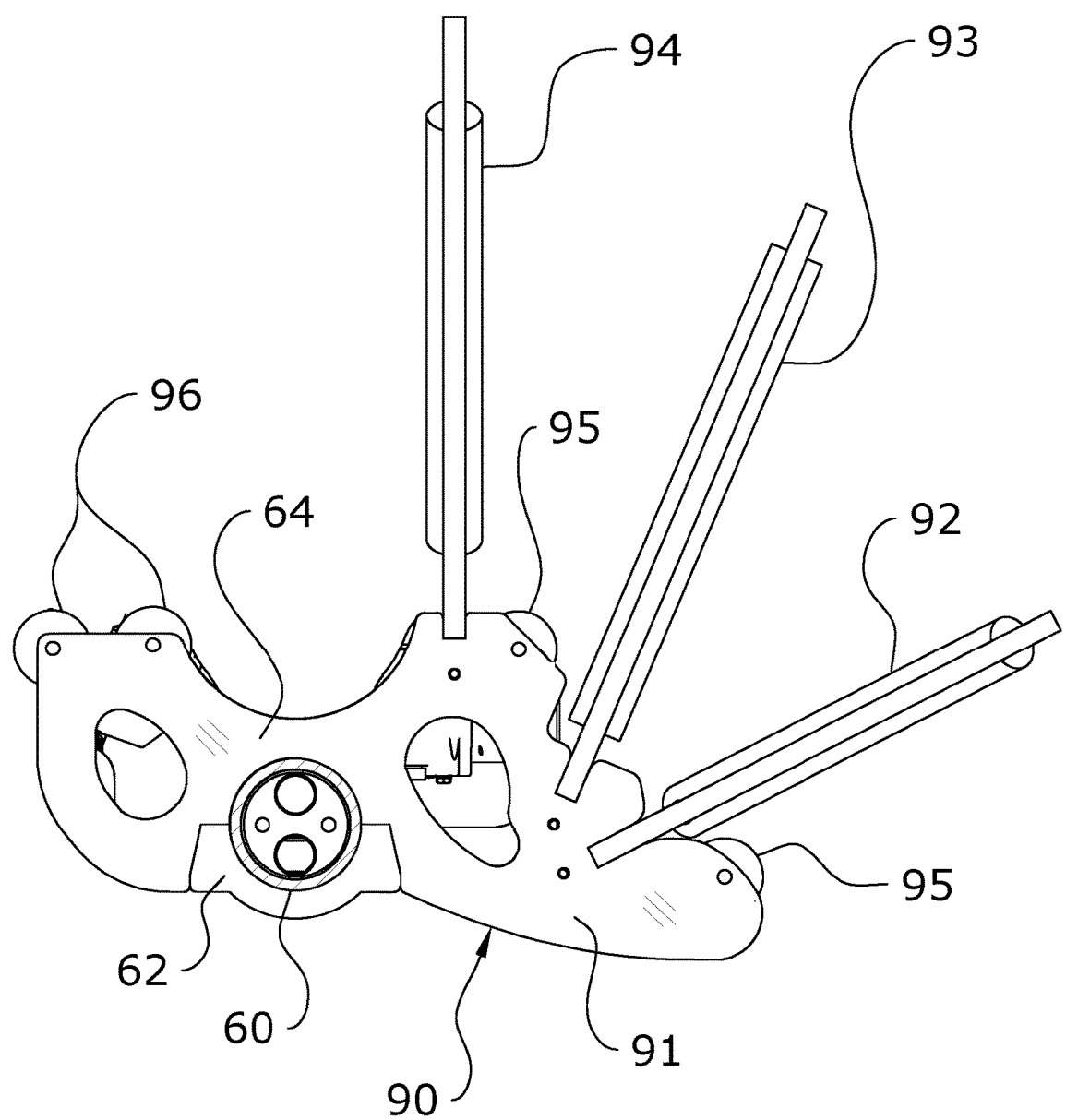
FIG. 22 is a left-side cross-section view of a folding roller assembly in accordance with an example embodiment.
Figure 23:
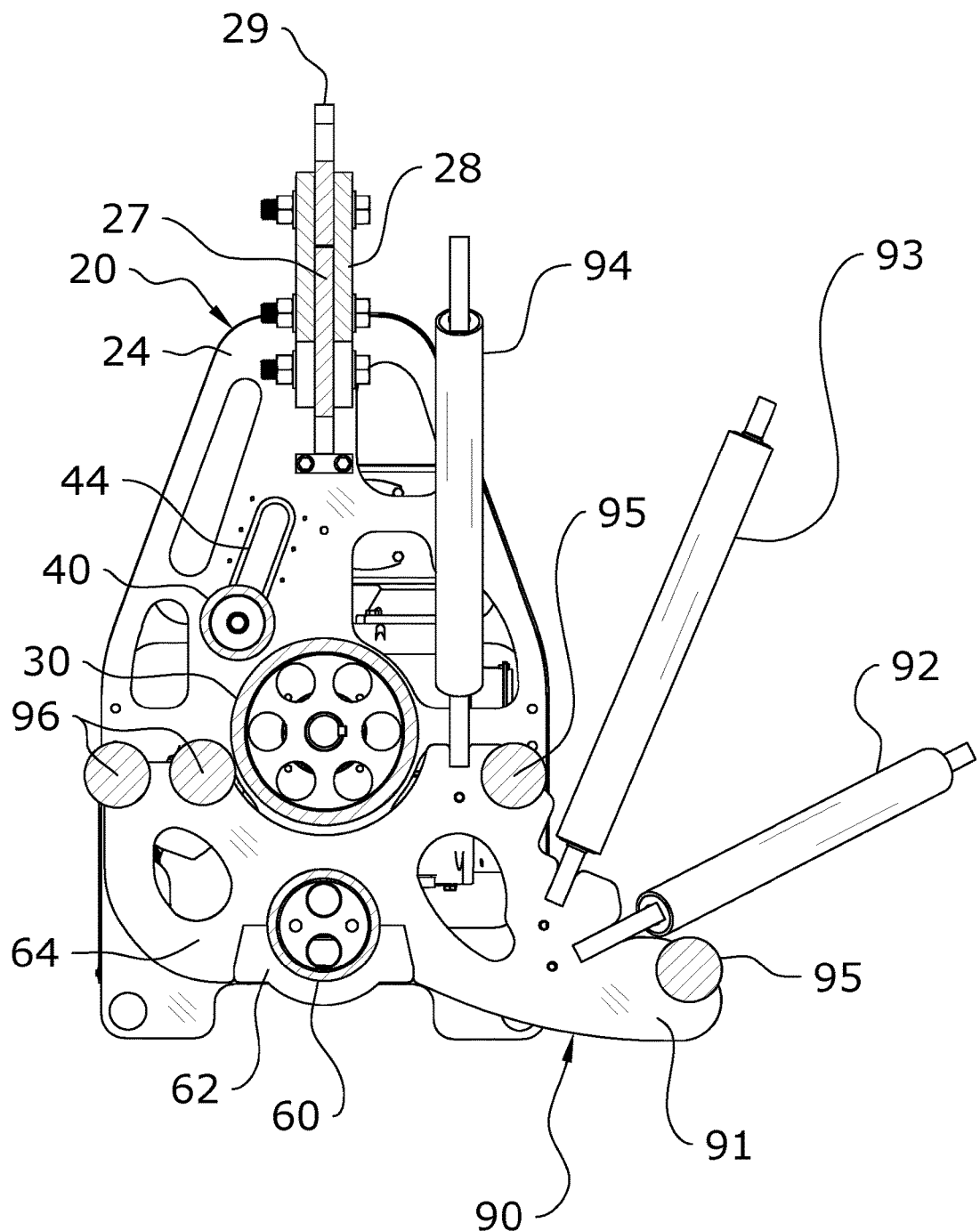
FIG. 23 is a left-side cross-section view of a CIPP liner feed roller in accordance with an example embodiment that includes a folding roller assembly.
Figure 24:
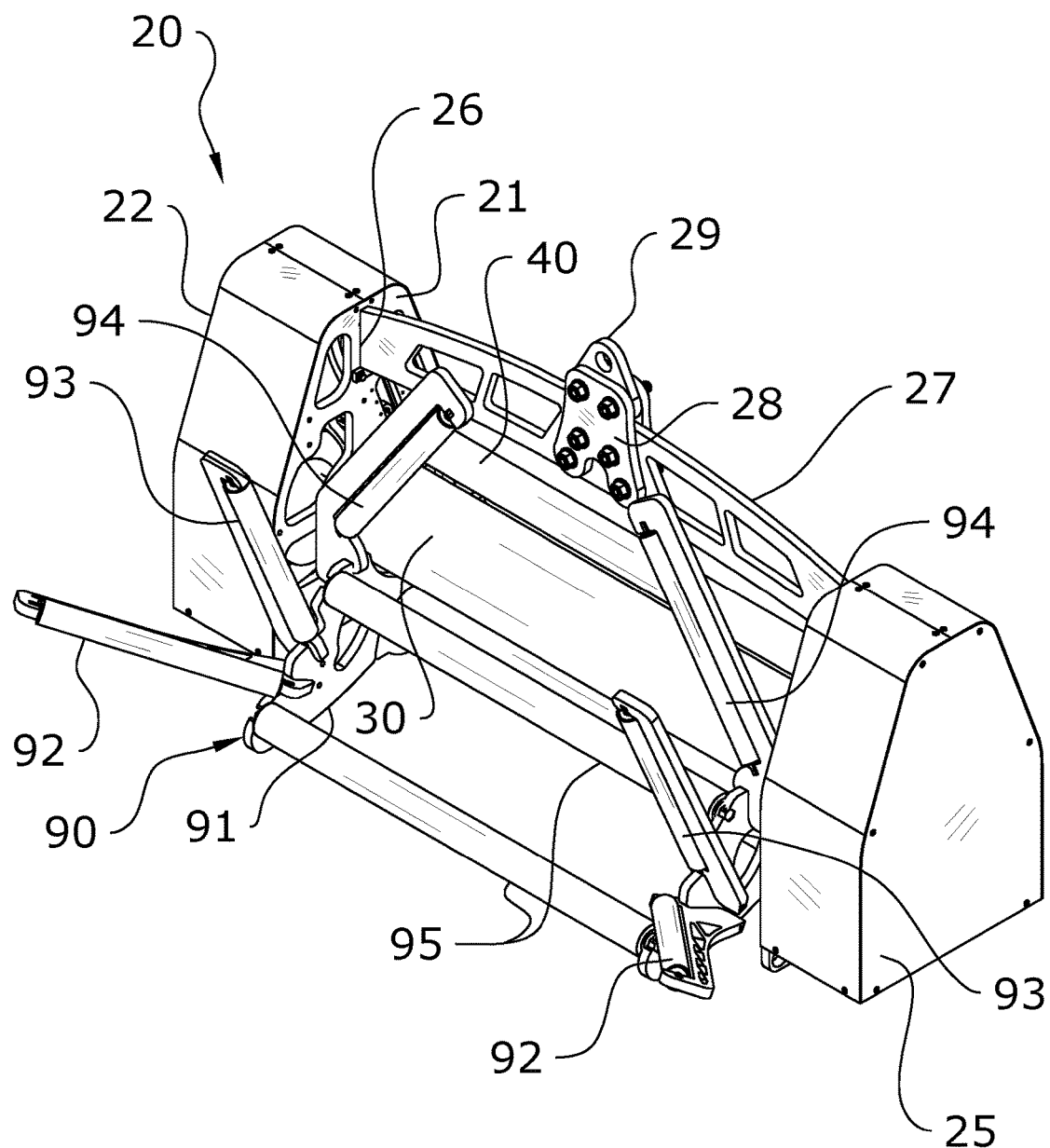
FIG. 24 is a perspective view of a CIPP liner feed roller in accordance with an example embodiment that includes a folding roller assembly.

If the controller 54 is configured to manage equipment on the opposite side of frame 20, cables can be routed through a passage in support beam 60. As shown in FIG. 21, the controller 54 is coupled to the motor 51 and an actuator 42 using a motor control cable 52 and an actuator cable 43. By routing power and control using controller 54 this enables easy implementation of an emergency shutoff switch to quickly shutdown all components of the CIPP liner feed roller. The controller 54 may also include any transformers, signal conditioners, transmitters and receivers. The controller 54 may also be coupled to a power source using a reel 59 which helps manage power cords. Power cords and remote cables can be configured to pass through access panel 58, or other openings or connection points.

The CIPP liner feed roller is generally coupled to a set of operator controls 56. In some embodiments, the operator controls 56 are coupled to the controller 54 using a cord that passes through the access panel 58. The operator controls 56 generally include the ability to control the rotation speed and direction of main roller 30, the position of the clamping roller 40 through the actuators 42, and an emergency shutoff switch. The operator controls 56 may be located remotely, or affixed to the side of the CIPP liner feed roller. The operator controls 56 may also be coupled to the controller 54 using wireless communication. In some cases, the operator controls 56 may be at least partially redundant allowing for a remote emergency shutdown switch as well as an emergency shutdown switch located on the CIPP liner feed roller itself.

I. Operation of Preferred Embodiment

One preferred embodiment can be used for the task of pulling folded CIPP liner 10 into an access opening 14, as shown in FIG. 26. For illustrative purposes, the CIPP liner feed roller shown in FIG. 26 does not include a means of support, such as support legs 71 or crane connected to bridge attachment 29. However, for purposes of this description of a preferred embodiment, the CIPP liner feed roller it is presumed that it is supported in a way that does not interfere with its performance of the exemplary task described herein.

In this exemplary task, as shown in FIG. 26, the CIPP liner 10 will be pulled using a pulling cable 13 into a conduit 16 via an access opening 14 with the assistance of a CIPP liner feed roller. For purposes of this example, it is assumed that the CIPP liner feed roller can be conveniently located in the immediate vicinity of the access opening 14 into which the CIPP liner 10 will be inserted. The CIPP liner 10 will be pulled from a liner box 11 that is on the ground at an elevation below that of the CIPP liner feed roller. In this embodiment, the access opening 14 is also located below the elevation the CIPP liner feed roller.

The first step in this embodiment is to configure the CIPP liner feed roller with the desired accessories and configuration for this exemplary task. In this embodiment, the CIPP liner feed roller will include an infeed table 72, a supplemental material holder 74, a balance roller 73, and a pair of guide rollers 70 on the outflow. The guide rollers 70 are attached to the support beam 60 on the outflow side of the CIPP liner feed roller. In this embodiment, the guide rollers 70 are positioned such that the space between them is substantially the same as the width of the CIPP liner 10. The space between the guide rollers 70 is aligned with the center of the main roller 30. To minimize stress on the CIPP liner 10, the infeed table 72 is positioned such that the CIPP liner 10 leaves the liner box 11 at the same approximate elevation as the lowest end of the infeed table 72. The balance roller 73 is positioned at the same approximate angle as the infeed table 72 and directly above the access opening 14. This position reduces the likelihood that the CIPP liner 10 will contact the sides of the access opening 14.

Once the CIPP liner feed roller has been configured, the next step is to prepare the CIPP liner 10 for insertion using the CIPP liner feed roller. This generally involves separating the clamping roller 40 and the main roller 30 using the actuators 42, pulling the free end of the CIPP liner 10 through the gap between the rollers 30, 40, and pressing the CIPP liner 10 by lowering the clamping roller 40 against the main roller 30. Because this embodiment uses the infeed table 72, guide rollers 70, and the balance roller 73, initial preparation will include insuring that the CIPP liner 10 follows the desired pathway. In this exemplary task, the desired pathway comprises having the CIPP liner 10 slide over infeed table 72, rolling over the balance roller 73 between the guide rollers 70, and into the access opening 14. Using the operator controls 56, the CIPP liner feed roller can be operated at slow speeds to test initial configuration so that appropriate adjustments can be made, if necessary. Once the CIPP liner 10 has been properly configured in the CIPP liner feed roller, the free end is attached to pulling cable 13, and is then inserted into the access opening 14.

The actual insertion process generally comprises pulling the CIPP liner 10 through the conduit 16 using a pulling cable 13. In order to avoid excess contact with the sides of the access opening 14 or the entry into the conduit 16, the CIPP liner feed roller will feed the CIPP liner 10 so as to maintain slack in the CIPP liner 10, which will generally feed the CIPP liner 10 out at the same rate that the CIPP liner 10 is being pulled through the conduit 16. In addition, by pressing the CIPP liner 10 between the main roller 30 and the clamping roller 40, the CIPP liner feed roller will tend to flatten any folds in the CIPP liner and straighten any kinks in the CIPP liner 10. For example, the CIPP liner 10 may be stored within a liner box 11 using accordion folds. The CIPP liner feed roller will at least partially flatten these folds before the CIPP liner 10 is inserted into the access opening 14. Guide rollers 70 will help maintain the alignment of the CIPP liner 10 to avoid potential feed errors. This process will continue until the desired amount of CIPP liner 10 has been inserted into the conduit 16. Any remaining portion of the CIPP liner 10 can then be cut off and sealed. Once the remaining portion of the CIPP liner 10 has been prepared for retrieval, the main roller 30 can be driven in reverse to extract this excess portion through the access opening 14 and towards the liner box 11.

Figure 27:
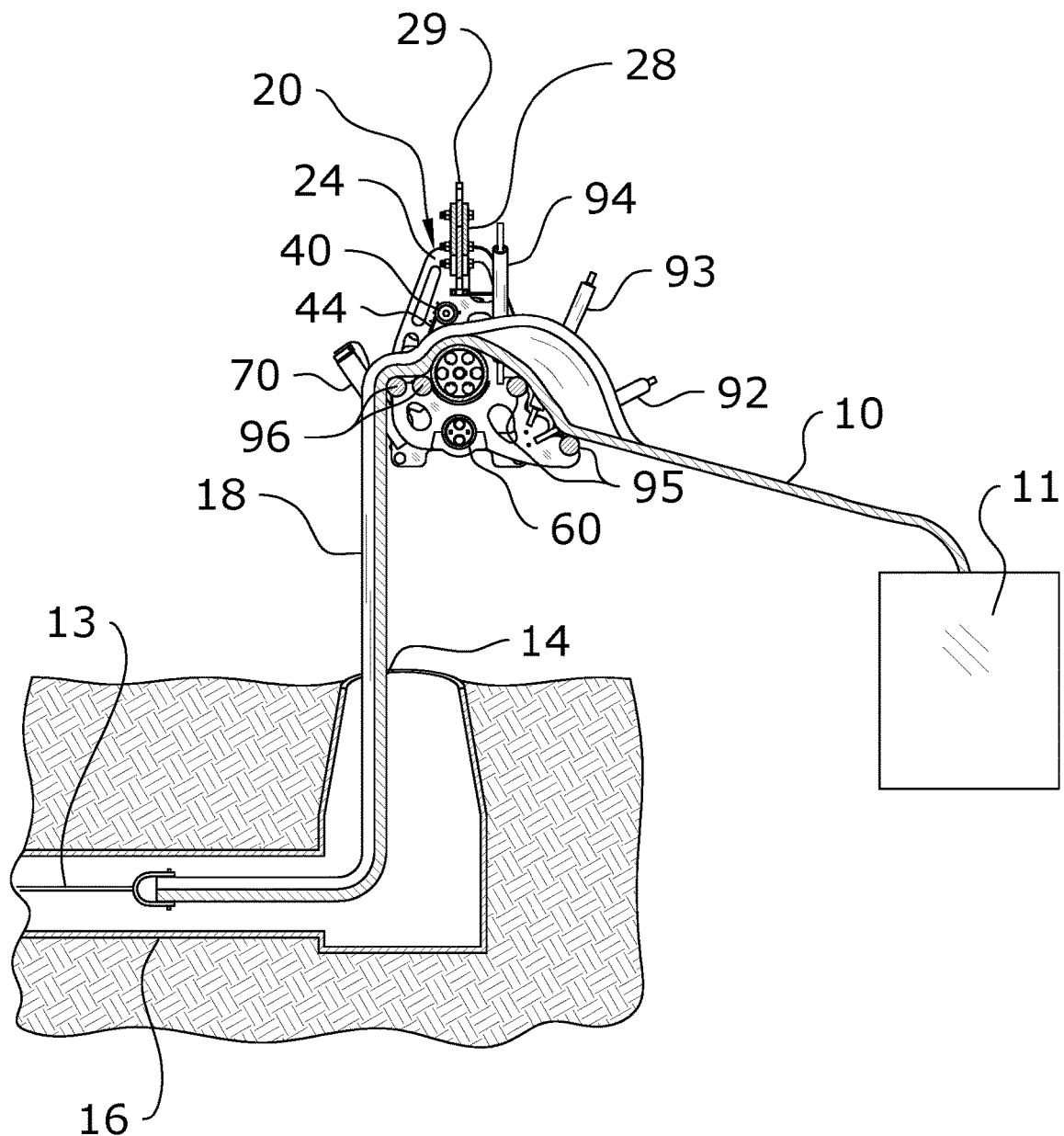
FIG. 27 is a left-side cross-section view illustrating a CIPP liner feed roller in accordance with an example embodiment being used to fold CIPP liner and insert the folded CIPP liner into an access opening.
Figure 30:
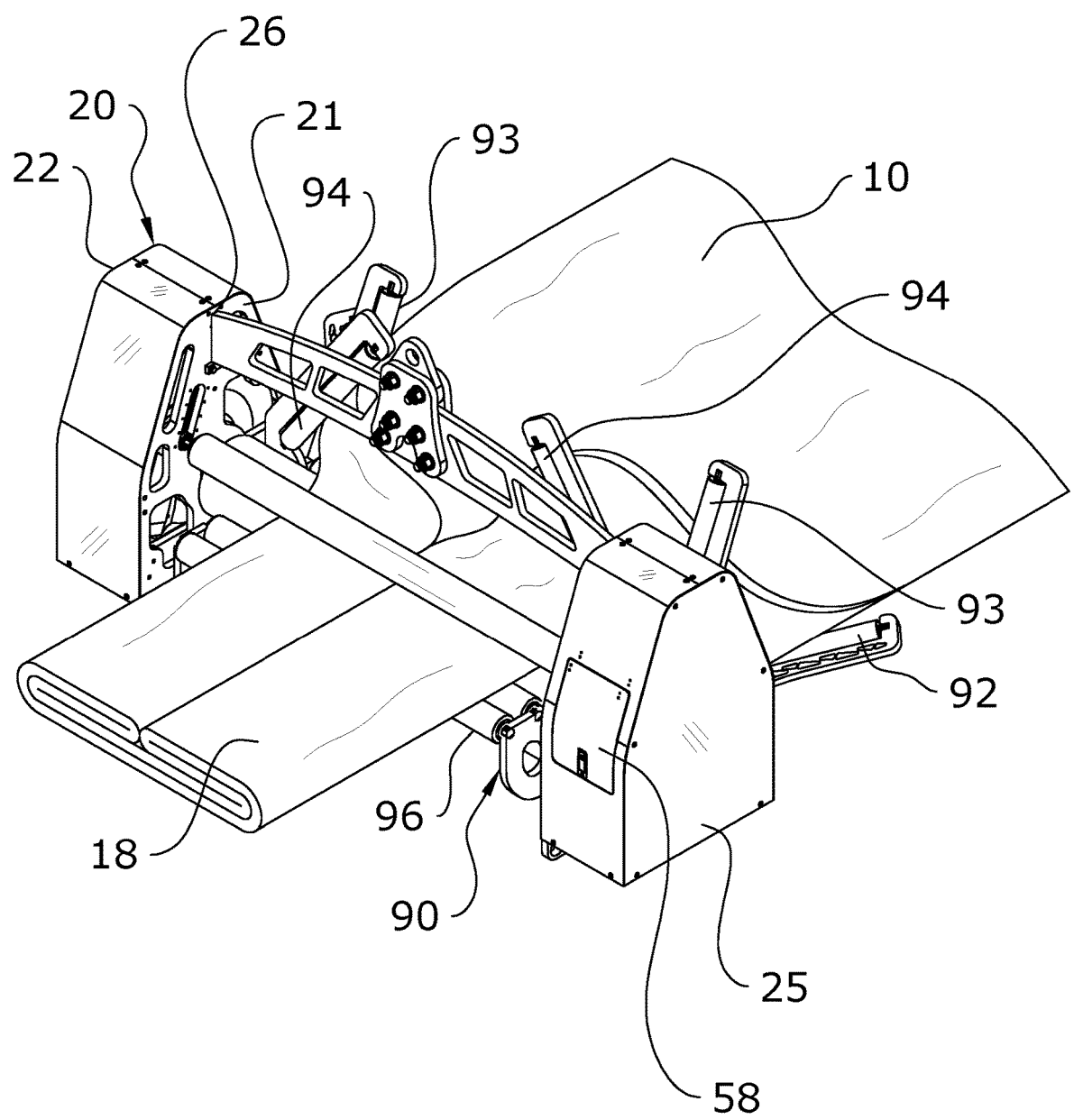
FIG. 30 is an alternate perspective view of an example embodiment of a feed roller assembly being used to fold CIPP liner as it passes through an example embodiment of a CIPP liner feed roller.

In an additional exemplary task, as shown in FIG. 27, the task described above will be modified such that folded CIPP liner 18 will be inserted into the conduit 16 rather than unfolded CIPP liner 10. Moreover, the folded CIPP liner 18 will be comprise two folds on either end as shown in FIG. 30.

The CIPP liner feed roller configuration for this task shall include a folding roller assembly 90 and guide rollers 70. The folding roller assembly 90 is attached to the support beam 60 on the inflow side of the CIPP liner feed roller. In this preferred embodiment, the folding roller assembly 90 is configured with three pairs of folding rollers: 92, 93, 94 that are progressively tilted inwards. The center of the feed roller assembly 90 is aligned with the center of the main roller 30. The guide rollers 70 are attached to the support beam 60 on the outflow side of the CIPP liner feed roller. In this embodiment, the guide rollers 70 are positioned such that the space between them is substantially the same as the width of the folded CIPP liner 10, which should be slightly more than half of the width of unfolded CIPP liner 10. The space between the guide rollers 70 is aligned with the center of the main roller 30 and consequently the center of the feed roller assembly 76.

Figure 28A:
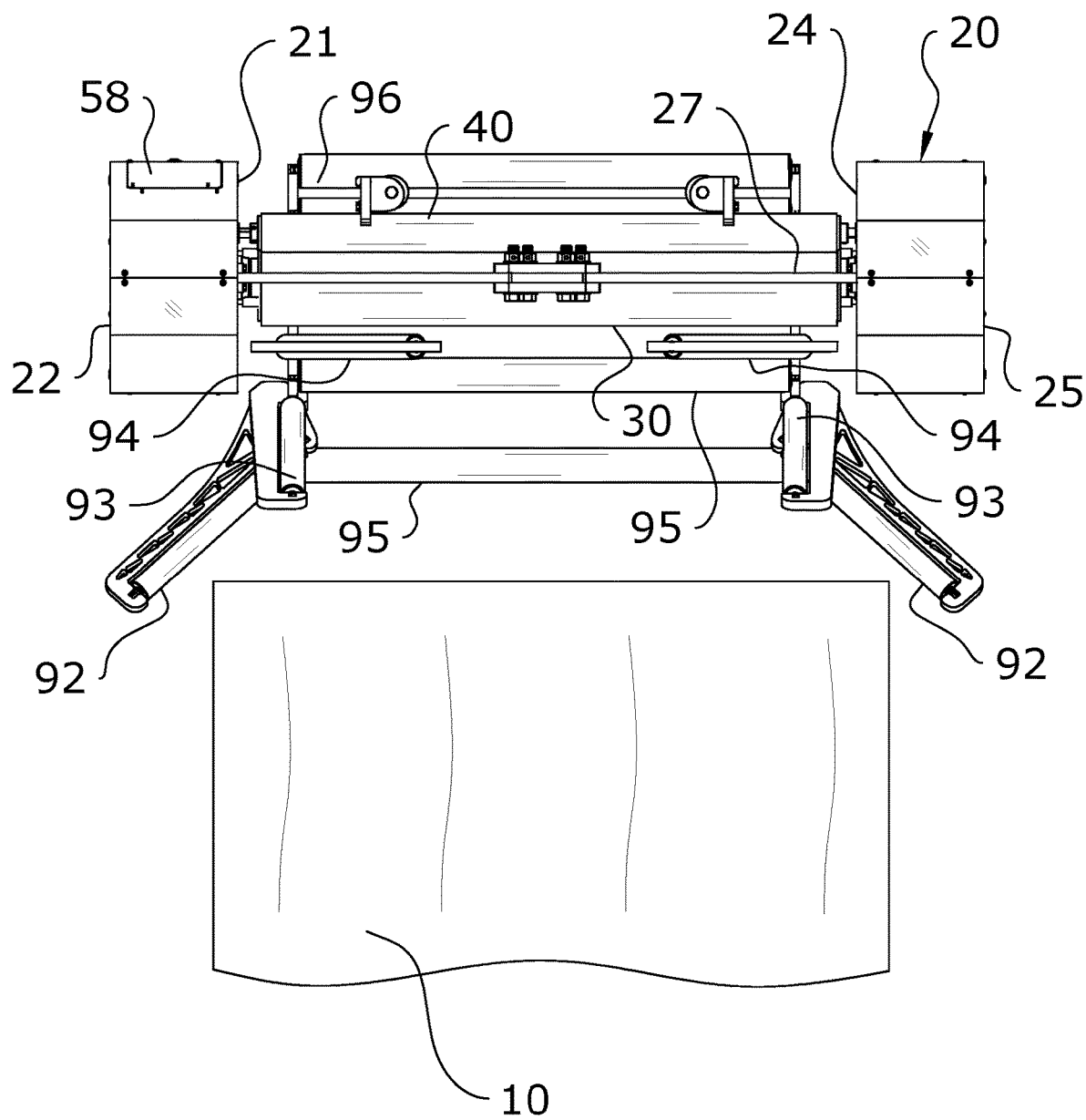
FIG. 28a is a top view illustrating a step in the use of an example embodiment of a feed roller assembly being used to fold CIPP liner as it passes through an example embodiment of a CIPP liner feed roller.
Figure 28B:
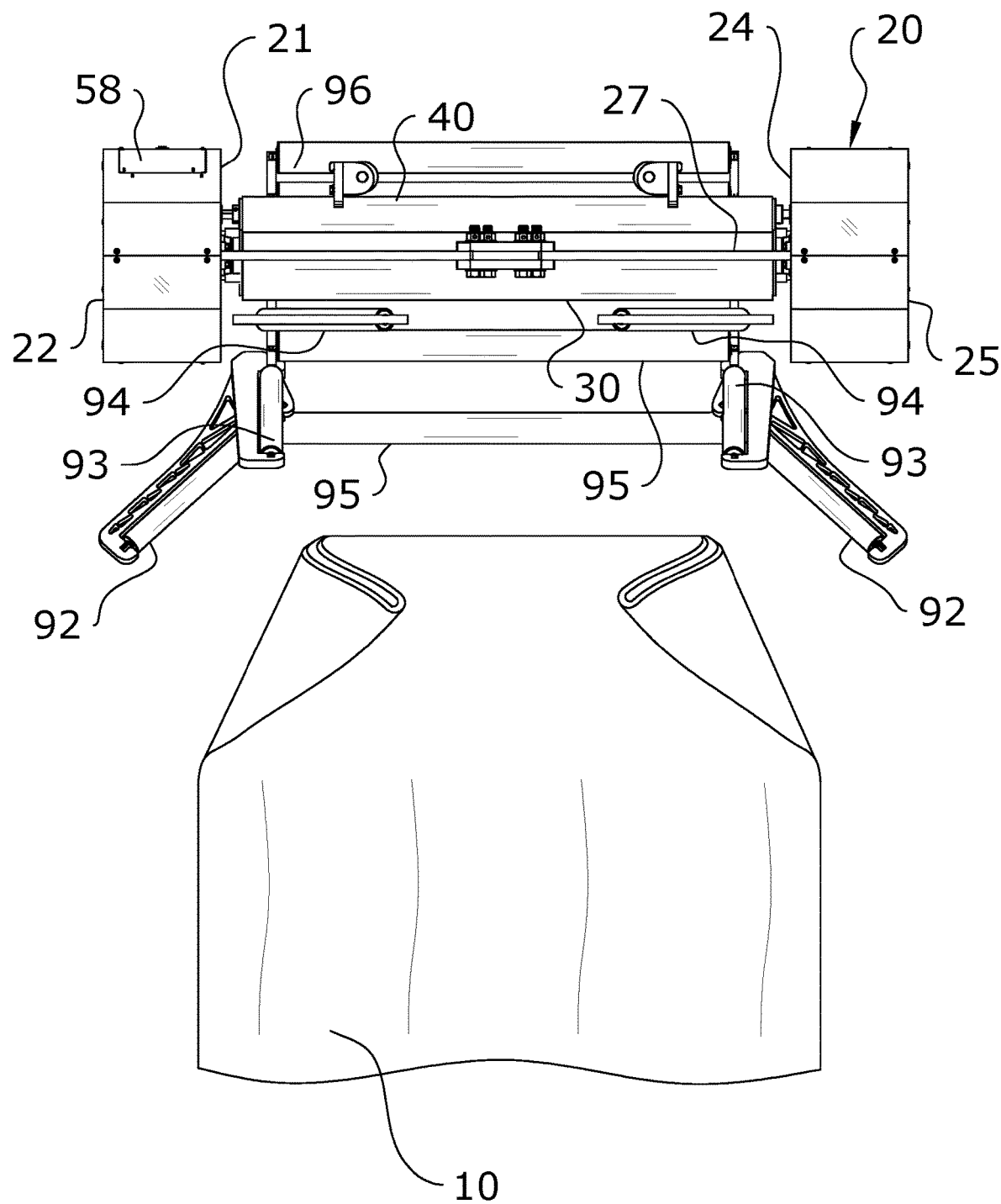
FIG. 28b is a top view illustrating a step in the use of an example embodiment of a feed roller assembly being used to fold CIPP liner as it passes through an example embodiment of a CIPP liner feed roller.
Figure 28C:
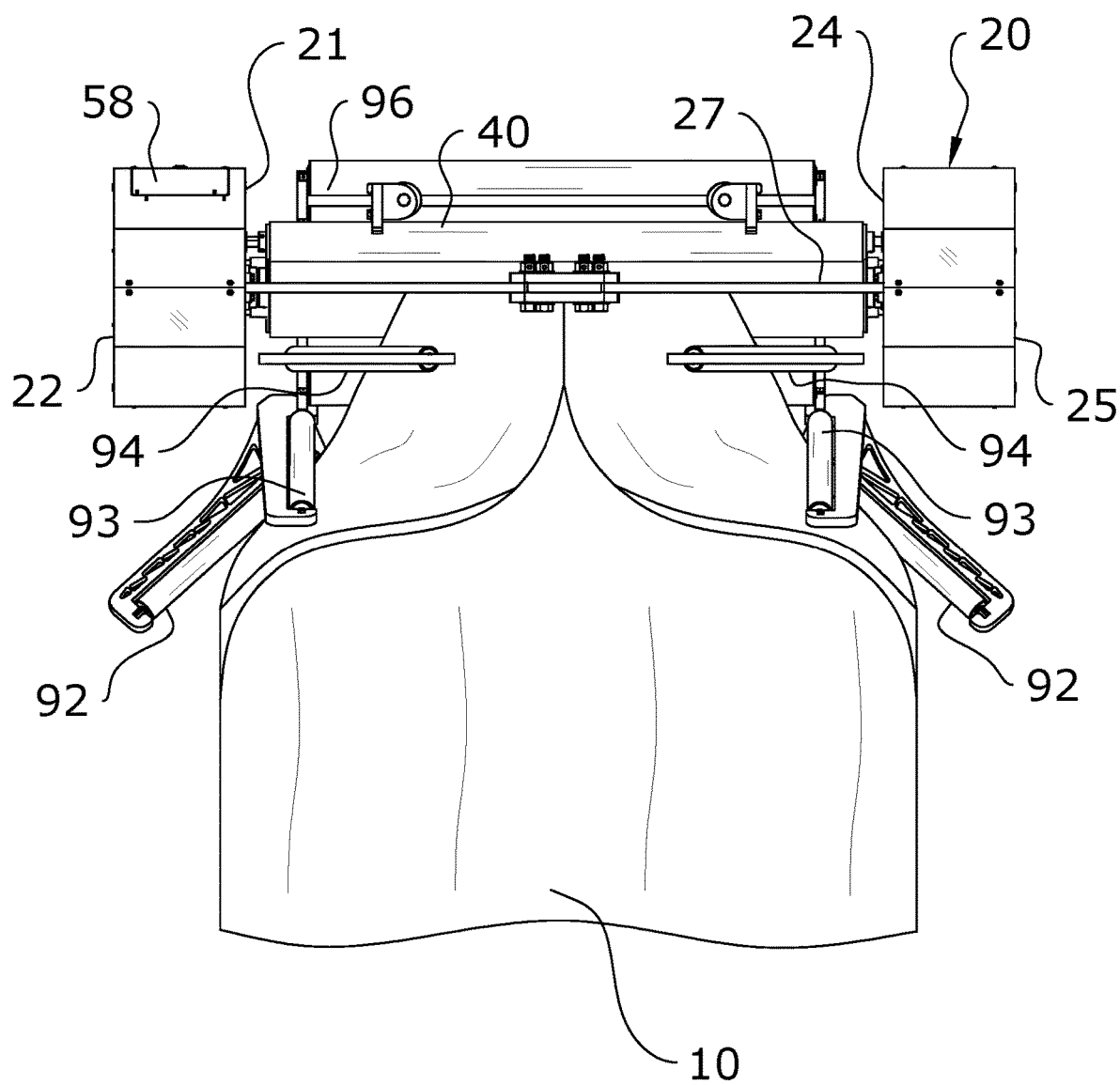
FIG. 28c is a top view illustrating a step in the use of an example embodiment of a feed roller assembly being used to fold CIPP liner as it passes through an example embodiment of a CIPP liner feed roller.
Figure 28D:
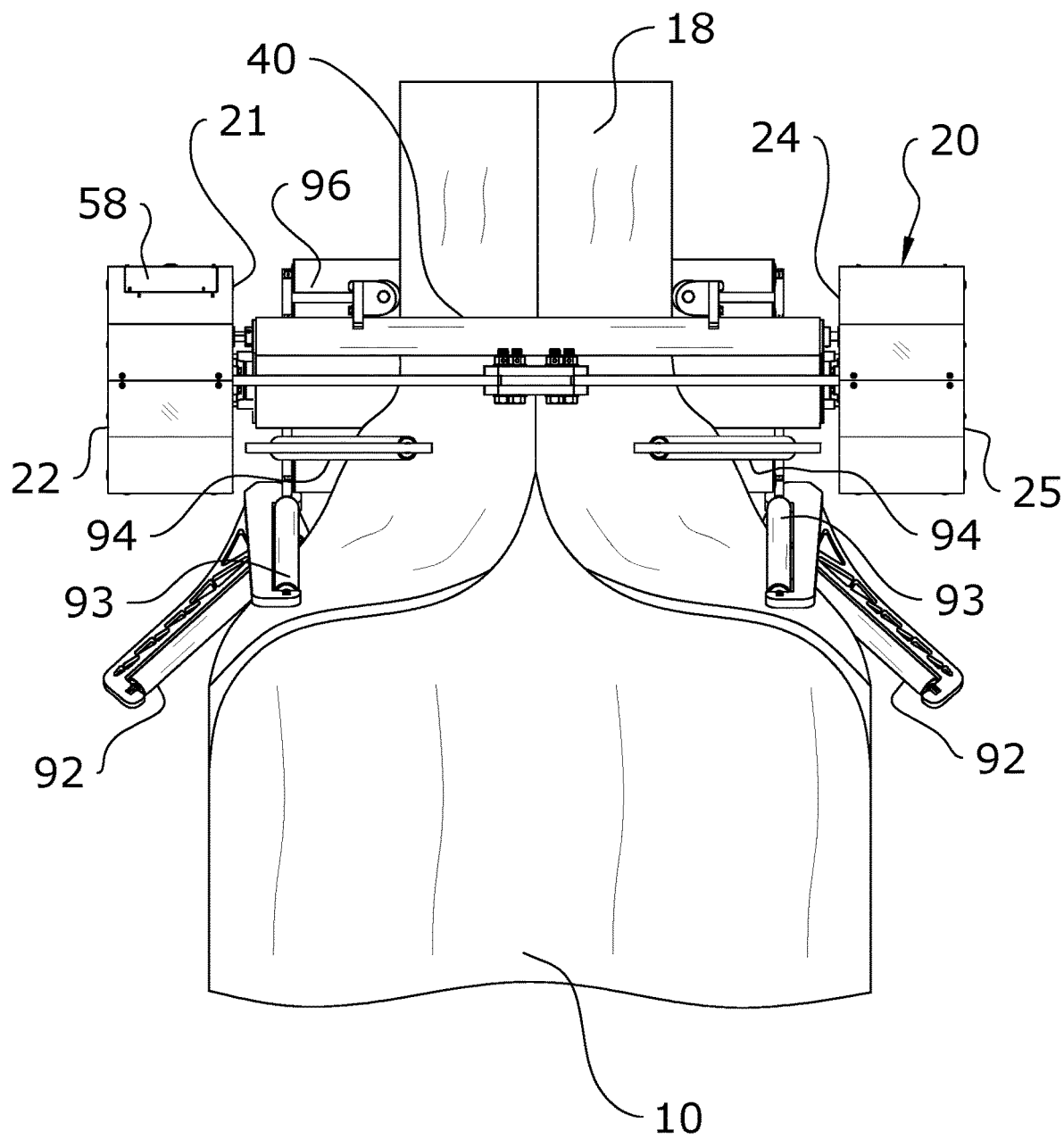
FIG. 28d is a top view illustrating a step in the use of an example embodiment of a feed roller assembly being used to fold CIPP liner as it passes through an example embodiment of a CIPP liner feed roller.
Figure 29:
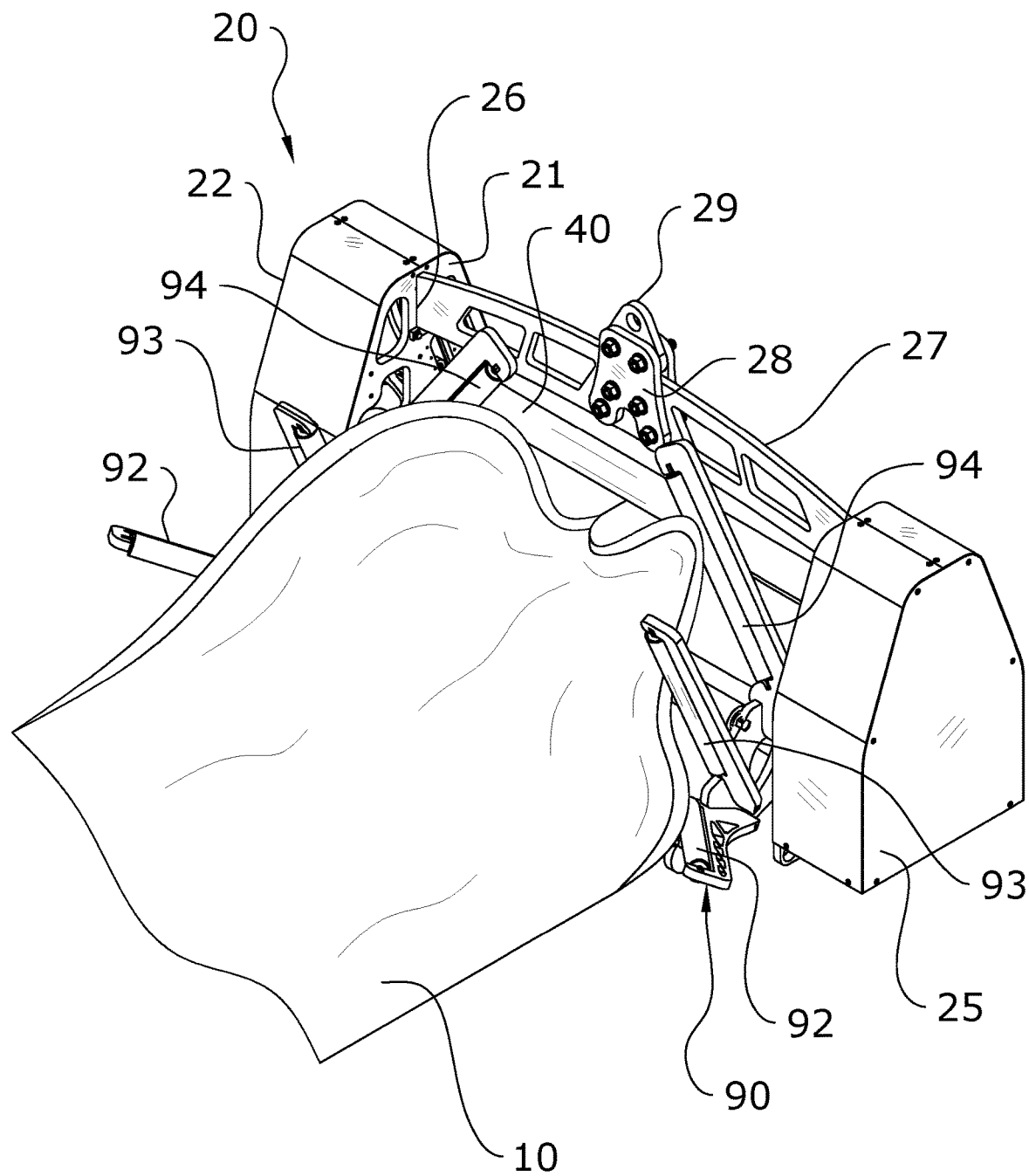
FIG. 29 is a perspective view of an example embodiment of a feed roller assembly being used to fold CIPP liner as it passes through an example embodiment of a CIPP liner feed roller.

After the CIPP liner feed roller has been configured for this additional exemplary task, the CIPP liner 10 can be prepared for insertion. FIG. 28a illustrates the exemplary configuration of the CIPP liner feed roller prior to preparation of CIPP liner 10. As shown in FIG. 28b, one step in preparing the CIPP liner 10 for insertion includes creating starter folds on the corners of CIPP liner 10. For this exemplary task, creating a starter fold includes curling and folding the free end of the CIPP liner 10. As shown in FIG. 28c, the free end of the CIPP liner 10 is passed through the folding roller assembly 90 and between the main roller 30 and the clamping roller 40. The folded end is inserted above inflow horizontal rollers 95 and between the sets of folding rollers 92, 93, 94. Then, the clamping roller 40 is lowered such that the free end of the CIPP liner 10 is folded and firmly pressed between the main roller 30 and the clamping roller 40. Using the operator controls 56, the main roller 30 can be rotated slowly to create a first portion of folded CIPP liner 18 as shown in FIG. 28d. The folded free-end of the CIPP liner 18 is fed over the outflow horizontal rollers 96 and between the guide rollers 70. If needed, the angles and positions of the guide rollers 70 are adjusted such that the folded CIPP liner 18 will be directed towards the access opening 14. Once the CIPP liner 10 has been properly configured within the feed roller, a pulling cable 13 is attached to the free end of the folded CIPP liner 18. FIGS. 29 and 30 illustrate a CIPP liner feed roller that has been prepared to feed folded CIPP liner 18 through the CIPP liner feed roller.

As described above, the CIPP liner 10 is fed through the folding roller assembly 90, which causes it to curl before it reaches the main roller 30. This preliminary curling of the CIPP liner 10 will improve the folding process of the main roller 30 and clamping roller 40. Because the CIPP liner 10 begins in a liner box 11 at a lower elevation than the CIPP liner feed roller, incoming CIPP liner 10 will initially contact the inflow horizontal rollers 95 on the folding roller assembly 90, which ensures that the CIPP liner 10 is curled by the folding rollers 92, 93, 94 as opposed to passing beneath them. The main roller 30 and the clamping roller 40 completes the fold as it passes between them. The guide rollers 70 on the outflow side maintain the alignment of the folded CIPP liner 18, which prevents folded CIPP liner 18 from unfolding immediately after it leaves the CIPP liner feed roller. Just as with unfolded CIPP liner 10, the feed rate of the CIPP liner feed roller would preferably match the rate at which the folded CIPP liner 18 is being pulled into the conduit 16. This process should be able to continue until the needed amount of CIPP liner 10 has been fed through the CIPP liner feed roller. However, if problems occur, the CIPP liner feed roller can be operated in the reverse direction to correct any errors before resuming normal operation.

Unless otherwise defined, all technical and scientific terms used herein have the same meaning as commonly understood by one of ordinary skill in the art to which this invention belongs. Although methods and materials similar to or equivalent to those described herein can be used in the practice or testing of the CIPP liner feed roller, suitable methods and materials are described above. All publications, patent applications, patents, and other references mentioned herein are incorporated by reference in their entirety to the extent allowed by applicable law and regulations. The CIPP liner feed roller may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A CIPP liner feed roller apparatus, comprising:
a frame;
a main roller attached to the frame;
a clamping roller attached to the frame and configured to be in parallel with the main roller;
a drive unit connected to the main roller, wherein the drive unit is configured to rotate the main roller;
a controller coupled with the drive unit, wherein the controller is configured to control the drive unit;
a bridge beam attached to the frame; and
a bridge connector attached to the bridge beam;
wherein the CIPP liner feed roller apparatus can be lifted using the bridge connector or an attachment thereto; and
wherein the CIPP liner feed roller apparatus is configured to pull a CIPP liner between the main roller and the clamping roller from a liner source and push the CIPP liner away from the main roller and the clamping roller.

2. The CIPP liner feed roller apparatus of claim 1, including a support beam attached to the frame and configured to be in parallel with the main roller.

3. The CIPP liner feed roller apparatus of claim 2, further comprising one or more guide rollers attached to the support beam configured to guide the CIPP liner before it is pulled between the main roller and the clamping roller.

4. The CIPP liner feed roller apparatus of claim 2, further comprising one or more guide rollers attached to the support beam configured to guide the CIPP liner after it is has been pushed away from the main roller and the clamping roller.

5. The CIPP liner feed roller apparatus of claim 2, further comprising a balance roller attached to the support beam and wherein the balance roller is configured in parallel to the main roller and is positioned to contact the CIPP liner after it has been pushed away from the main roller and the clamping roller.

6. The CIPP liner feed roller apparatus of claim 2, further comprising a plurality of folding rollers configured to curl the CIPP liner before it is pulled between the main roller and the clamping roller, wherein the plurality of folding rollers are attached to the support beam.

7. The CIPP liner feed roller apparatus of claim 6, wherein the CIPP liner feed roller apparatus is configured to push the CIPP liner away from the main roller and the clamping roller such that the CIPP liner will contain at least one fold.

8. The CIPP liner feed roller apparatus of claim 1, including at least one actuator connected to the clamping roller, wherein a distance between the clamping roller and the main roller can be adjusted using the at least one actuator, wherein the CIPP liner is pressed between the clamping roller and the main roller when the clamping roller is moved toward the main roller.

9. The CIPP liner feed roller apparatus of claim 8, wherein the at least one actuator is comprised of a first actuator and a second actuator, wherein the first actuator is attached to a first end of the clamping roller and the second actuator is attached to a second end of the clamping roller.

10. The CIPP liner feed roller apparatus of claim 1, including one or more springs connected to the clamping roller.

11. The CIPP liner feed roller apparatus of claim 1, wherein the controller is coupled with the drive unit via a cable or wireless communication.

12. A CIPP liner feed roller apparatus, comprising:
a frame;
a main roller attached to the frame;
a clamping roller attached to the frame and parallel with the main roller;
at least one actuator or at least one spring connected to the clamping roller, wherein a distance between the clamping roller and the main roller can be adjusted using the at least one actuator or the at least one spring;
a drive unit connected to the main roller, wherein the drive unit is configured to rotate the main roller;
a controller coupled with the drive unit via a cable or wireless communication, wherein the controller is configured to control the drive unit;
a bridge beam attached to the frame; and
a bridge connector attached to the bridge beam;
wherein the CIPP liner feed roller apparatus can be lifted using the bridge connector or an attachment thereto; and
wherein the CIPP liner feed roller apparatus is configured to pull a CIPP liner between the main roller and the clamping roller from a liner source and push the CIPP liner away from the main roller and the clamping roller.

13. The CIPP liner feed roller apparatus of claim 12, including a support beam attached to the frame and configured to be in parallel with the main roller.

14. The CIPP liner feed roller apparatus of claim 13, further comprising one or more guide rollers attached to the support beam configured to guide the CIPP liner before it is pulled between the main roller and the clamping roller.

15. The CIPP liner feed roller apparatus of claim 13, further comprising one or more guide rollers attached to the support beam configured to guide the CIPP liner after it is has been pushed away from the main roller and the clamping roller.

16. The CIPP liner feed roller apparatus of claim 13, further comprising a balance roller attached to the support beam and wherein the balance roller is configured in parallel to the main roller and is positioned to contact the CIPP liner after it has been pushed away from the main roller and the clamping roller.

17. The CIPP liner feed roller apparatus of claim 13, further comprising a plurality of folding rollers configured to curl the CIPP liner before it is pulled between the main roller and the clamping roller, wherein the plurality of folding rollers are attached to the support beam.

18. The CIPP liner feed roller apparatus of claim 17, wherein the CIPP liner feed roller apparatus is configured to push the CIPP liner away from the main roller and the clamping roller such that the CIPP liner will contain at least one fold.

19. The CIPP liner feed roller apparatus of claim 13, wherein the at least one actuator is comprised of a first actuator and a second actuator, wherein the first actuator is attached to a first end of the clamping roller and the second actuator is attached to a second end of the clamping roller.

20. A CIPP liner feed roller apparatus, comprising:
a frame;
a main roller attached to the frame;
a clamping roller attached to the frame and parallel with the main roller;
a first actuator and a second actuator, wherein the first actuator is attached to a first end of the clamping roller and the second actuator is attached to a second end of the clamping roller, wherein a distance between the clamping roller and the main roller can be adjusted using the first actuator and the second actuator;
a drive unit connected to the main roller, wherein the drive unit is configured to rotate the main roller;
a controller coupled with the drive unit via a cable or wireless communication, wherein the controller is configured to control the drive unit;
a bridge beam attached to the frame; and
a bridge connector attached to the bridge beam;
wherein the CIPP liner feed roller apparatus can be lifted using the bridge connector or an attachment thereto; and
wherein the CIPP liner feed roller apparatus is configured to pull a CIPP liner between the main roller and the clamping roller from a liner source and push the CIPP liner away from the main roller and the clamping roller.

21. The CIPP liner feed roller apparatus of claim 20, including a support beam attached to the frame and configured to be in parallel with the main roller.

22. The CIPP liner feed roller apparatus of claim 21, further comprising one or more guide rollers attached to the support beam configured to guide the CIPP liner before it is pulled between the main roller and the clamping roller.

23. The CIPP liner feed roller apparatus of claim 21, further comprising one or more guide rollers attached to the support beam configured to guide the CIPP liner after it is has been pushed away from the main roller and the clamping roller.

24. The CIPP liner feed roller apparatus of claim 21, further comprising a balance roller attached to the support beam and wherein the balance roller is configured in parallel to the main roller and is positioned to contact the CIPP liner after it has been pushed away from the main roller and the clamping roller.

25. The CIPP liner feed roller apparatus of claim 21, further comprising a plurality of folding rollers configured to curl the CIPP liner before it is pulled between the main roller and the clamping roller, wherein the plurality of folding rollers are attached to the support beam.

26. The CIPP liner feed roller apparatus of claim 25, wherein the CIPP liner feed roller apparatus is configured to push the CIPP liner away from the main roller and the clamping roller such that the CIPP liner will contain at least one fold.

* * * * *